(12) United States Patent
Tomite et al.

(10) Patent No.: US 8,698,804 B2
(45) Date of Patent: Apr. 15, 2014

(54) IMAGE PROCESSING APPARATUS AND IMAGE PROCESSING METHOD

(75) Inventors: Kaname Tomite, Tokyo (JP); Masakazu Fujiki, Kawasaki (JP); Yasuo Katano, Kawasaki (JP); Takayuki Hashimoto, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 817 days.

(21) Appl. No.: 12/265,187

(22) Filed: Nov. 5, 2008

(65) Prior Publication Data

US 2009/0115784 A1    May 7, 2009

(30) Foreign Application Priority Data

Nov. 7, 2007  (JP) .................................. 2007-289966
Jan. 15, 2008 (JP) .................................. 2008-006291

(51) Int. Cl.
*G06T 15/50* (2011.01)

(52) U.S. Cl.
USPC ......................................................... 345/426

(58) Field of Classification Search
USPC ......................................................... 345/426
See application file for complete search history.

(56) References Cited

U.S. PATENT DOCUMENTS

| | | | | |
|---|---|---|---|---|
| 5,870,098 | A * | 2/1999 | Gardiner ........................ | 345/426 |
| 6,396,495 | B1 * | 5/2002 | Parghi et al. ................... | 345/426 |
| 7,126,605 | B1 * | 10/2006 | Munshi et al. ................. | 345/428 |
| 7,184,052 | B2 * | 2/2007 | Wang et al. .................... | 345/582 |
| 2004/0257364 | A1 * | 12/2004 | Basler ........................... | 345/426 |
| 2005/0231532 | A1 | 10/2005 | Suzuki et al. | |
| 2006/0279570 | A1 * | 12/2006 | Zhou et al. ..................... | 345/426 |
| 2008/0001947 | A1 * | 1/2008 | Snyder et al. .................. | 345/426 |

FOREIGN PATENT DOCUMENTS

| | | |
|---|---|---|
| JP | 05-046782 A | 2/1993 |
| JP | 10-334278 A | 12/1998 |
| JP | 2005-293142 | 10/2005 |

OTHER PUBLICATIONS

Streaming Video Textures for Mixed Reality Applications in Interactive Ray Tracing Environments, Pomi et al., 2003.*
Realtime and Interactive Ray Tracing Basics and Latest Developments, Wollert, 2006.*
Ray Tracing: Graphics for the Masses, Rademacher, 1997.*
Improving Ray Tracing Precision by Object Space Intersection Computation, Dammertz, 2006.*
Ray Tracing Point Set Surfaces, Adamson et al., 2003.*
Automatic generation of consistent shadows for Augmented Reality, Jacobs et al., 2005.*
Towards Using Realistic Ray Tracing in Augmented Reality Applications with Natural Lighting, Scheer et al., 2007.*

(Continued)

*Primary Examiner* — David Zarka
*Assistant Examiner* — Phong Nguyen
(74) *Attorney, Agent, or Firm* — Cowan, Liebowitz & Latman, P.C.

(57) ABSTRACT

Upon generation of an image of a virtual space on which a virtual object is laid out using a ray tracing method, an approximate virtual object, which is configured by at least one virtual element to approximate the shape of a physical object, is laid out on the virtual space. Then, intersect determination between a ray generated based on the ray tracing method and an object on the virtual space is executed. As a result of the intersect determination, when the ray and the approximate virtual object have a predetermined intersect state, a pixel corresponding to the ray is generated based on a ray before the predetermined intersect state is reached.

9 Claims, 17 Drawing Sheets

(56) References Cited

OTHER PUBLICATIONS

"Introduction to Realtime Ray Tracing, Siggraph 2005—Course 38", Siggraph 2005, Jul. 31, 2005, Aug. 4, 2009, XP040055134.

Andreas Pomi and Philipp Slusallek, "Interactive Ray Tracing for Virtual TV Studio Applications", Journal of Virtual Reality and Broadcasting vol. 2, Dec. 14, 2005, XP002551559, Retrieved from the Internet: URL: www.jvrb.org/2.2005/220051.pdf> [retrieved on Oct. 20, 2009].

Thomas Wollert, "Realtime and Interactive Ray Tracing Basics and Latest Developments" Jun. 22, 2006, XP002551558, Munich University of Applied Sciences, Munchen, DE, Retrieved from the Internet: URL:http://www.woellert.info/home/innages/M_advsem_ausarbeitung.pdf> [retrieved on Oct. 19, 2009] chapter 2, chapter 8.1.4.

Fabian Scheer, Oliver Abert, Stefan Muller, "Towards Using Realistic Ray Tracing in Augmented Reality Applications with Natural Lighting", 4. Workshop "Virtuelle Und Erweiterte Realitat" Der Gi-Fachgruppe VR/AR, Jul. 15, 2007, XP002551557, Weimar, DE, Retrieved from the Internet: URL:http://www.uni-koblenz..de/{abert/Site/Publications_Files/ARVR07-1.PDF> [retrieved on Oct. 19, 2009].

All of the above references were cited in a Nov. 20, 2009 European Search Report (copy enclosed) of the counterpart European Patent Application No. 08018838.6.

Interactive Mixed Reality Rendering in a Distributed Ray Tracing Framework Andreas Pomi, and Philipp Slusallek IEEE and CAM International Symposium on Mixed and Augmented Reality (ISMAR) 2004, Student Colloquium, Arlington, USA Nov. 2-5, 2004.

Andreas Pomi et al., Interactive In-Shader Image-Based Visual Hull Reconstruction and Compositing of Actors in a Distributed Ray Tracing Framework, 10 pages 1. Workshop VR/AR, Sep. 2004.

The article was cited in a European Office Action issued on Dec. 29, 2011, which is enclosed, that issued in the corresponding European Patent Application No. 08018838.6.

The above references were cited in a Jan. 30, 2012 Japanese Office Action, which is enclosed without an English Translation, that issued in Japanese Patent Application No. 2008-006291.

Christine Chevrier, "Handling Interactions between Real and Virtual Worlds" Proceeding of CG International 1996, pp. 74-83 (XP055091412).

The above article was cited in a European Office Action issued on Dec. 12, 2013, that issued in the corresponding European Patent Application No. 08 018 838.6.

\* cited by examiner

IMAGE PROCESSING APPARATUS AND IMAGE PROCESSING METHOD

BACKGROUND OF THE INVENTION

1. Field of the Invention

The present invention relates to a technique for generating an image of a virtual space according to a ray tracing method.

2. Description of the Related Art

An MR (Mixed Reality) technique is known. By superposing a computer graphics (CG) image onto a captured scenery as a background, and presenting the superposed image to the user, this technique allows the user to experience an environment as if a virtual object were existing at that place.

Conventionally, a system that combines the MR technique and ray tracing technique has been proposed (non-patent reference 1). In a rendering system disclosed in non-patent reference 1, an MR image is generated in such a manner that a virtual object is superposed on a captured image as a background, which is acquired as a video image, by rendering that virtual object by a ray tracing method. An example of rendering using this system expresses a state in which a CG sphere as a virtual object casts a shadow over a floor as a physical object. In order to realize such expression, a virtual object that expresses the floor as the physical object is defined. Then, an image of the shadow cast over this virtual object corresponding to the floor is generated, and is composited with an image of the physical floor.

Also, a method of expressing correct depth ordering between a virtual object and physical object on an MR space by laying out a virtual object that expresses a physical object on an MR space based on the sensing result of the position and orientation of the physical object has been proposed (patent reference 1).

[Non-patent Reference 1] Interactive Mixed Reality Rendering in a Distributed Ray Tracing Framework, Andreas Pomi, and Philipp Slusallek, IEEE and ACM International Symposium on Mixed and Augmented Reality (ISMAR) 2004, Student Colloquim, Arlington, USA, Nov. 2-5, 2004

[Patent Reference 1] Japanese Patent Laid-Open No. 2005-293142

In general, one uses a shadow and image of reflection as clues upon recognizing the positional relationship between objects from visual information. Therefore, even in case of MR, in order to allow the user to correctly recognize the positional relationship between objects, it is indispensable to correctly express a shadow and reflection. In this case, not only a shadow and reflection from a virtual object to another virtual object, but also those from a physical object to a virtual object have to be correctly expressed.

In non-patent reference 1, a shadow which is cast from a virtual object over another virtual object (expressed as a transparent object) that expresses a floor as a physical object is rendered. Assume that there are two virtual objects which express physical objects, and have the relationship in that one casts a shadow over the other. An image of the shadow in this case appears in an image obtained by capturing a physical space. Therefore, the image of the shadow need not be generated anew by rendering the virtual objects. However, since non-patent reference 1 does not consider this case, an image of an unwanted shadow is generated in addition to the shadow in the captured image. This problem may also be posed when a shadow (self shadow) is generated inside a virtual object that expresses one physical object. Furthermore, in non-patent reference 1, a reflection cannot be correctly expressed as in the shadow.

SUMMARY OF THE INVENTION

The present invention has been made in consideration of the aforementioned problems, and has as its object to provide a technique for correctly expressing a shadow and reflection associated with an approximate virtual object configured by a plurality of virtual elements, which are combined to approximate a shape of a physical object having a three-dimensional 3D) shape.

According to the first aspect of the present invention, an image processing apparatus including a generation unit which generates an image of a virtual space on which a virtual object is laid out, using a ray tracing method, the apparatus comprises:

a unit which combines a plurality of virtual elements so as to approximate a shape of a physical object, and lays out an approximate virtual object configured by the plurality of combined virtual elements on the virtual space;

a determination unit which executes intersect determination between a ray generated based on the ray tracing method and a virtual object on the virtual space; and a control unit which controls, when the ray and the approximate virtual object have a predetermined intersect state as a result of the intersect determination, the generation unit to generate a pixel corresponding to the ray based on the ray before the predetermined intersect state is reached.

According to the second aspect of the present invention, an image processing method to be executed by an image processing apparatus including a generation unit which generates an image of a virtual space on which a virtual object is laid out using a ray tracing method, the method comprises:

a step of combining a plurality of virtual elements so as to approximate a shape of a physical object, and laying out an approximate virtual object configured by the plurality of combined virtual elements on the virtual space;

a determination step of executing intersect determination between a ray generated based on the ray tracing method and a virtual object on the virtual space; and a control step of controlling, when the ray and the approximate virtual object have a predetermined intersect state as a result of the intersect determination, the generation unit to generate a pixel corresponding to the ray based on the ray before the predetermined intersect state is reached.

According to the third aspect of the present invention, an image processing apparatus including a generation unit which generates an image of a virtual space on which a virtual object is laid out using a ray tracing method, the apparatus comprises:

a unit which lays out, on the virtual space, an approximate virtual object configured by at least one virtual element so as to approximate a shape of a physical object;

a determination unit which executes intersect determination between a ray generated based on the ray tracing method and an object on the virtual space; and a control unit which controls, when the ray and the object have a predetermined intersect state as a result of the intersect determination, the generation unit to generate a pixel corresponding to the ray based on the ray before the predetermined intersect state is reached.

According to the fourth aspect of the present invention, an image processing method to be executed by an image processing apparatus including a generation unit which generates an image of a virtual space on which a virtual object is laid out using a ray tracing method, the method comprises:

a step of laying out, on the virtual space, an approximate virtual object configured by at least one virtual element so as to approximate a shape of a physical object;

a determination step of executing intersect determination between a ray generated based on the ray tracing method and an object on the virtual space; and a control step of controlling, when the ray and the object have a predetermined intersect state as a result of the intersect determination, the generation unit to generate a pixel corresponding to the ray based on the ray before the predetermined intersect state is reached.

Further features of the present invention will become apparent from the following description of exemplary embodiments with reference to the attached drawings.

DESCRIPTION OF THE EMBODIMENTS

Preferred embodiments of the present invention will be described in detail hereinafter with reference to the accompanying drawings. Note that these embodiments will be explained as examples of the preferred arrangement of the invention described in the scope of the claims, and the invention is not limited to the embodiments to be described hereinafter.

[First Embodiment]

In this embodiment, an image of a virtual space (virtual space image) is generated using a known ray tracing method so as to express shadows and reflections of physical and virtual objects. A composite image is generated by superposing the generated virtual space image on a physical space image, and the generated composite image is presented to a viewer.

However, in order to allow one who observes an MR space that blends physical and virtual spaces to correctly recognize the positional relationship between objects from visual information, a shadow and reflection of not only a virtual object but also a physical object have to be correctly expressed.

Hence, in this embodiment, in order to correctly express a shadow and reflection of a physical object in the virtual space image, when a ray successively intersects an approximate virtual object configured by a plurality of virtual elements which are combined to approximate the shape of a physical object, the subsequent generation of the ray is controlled.

Figure 1:
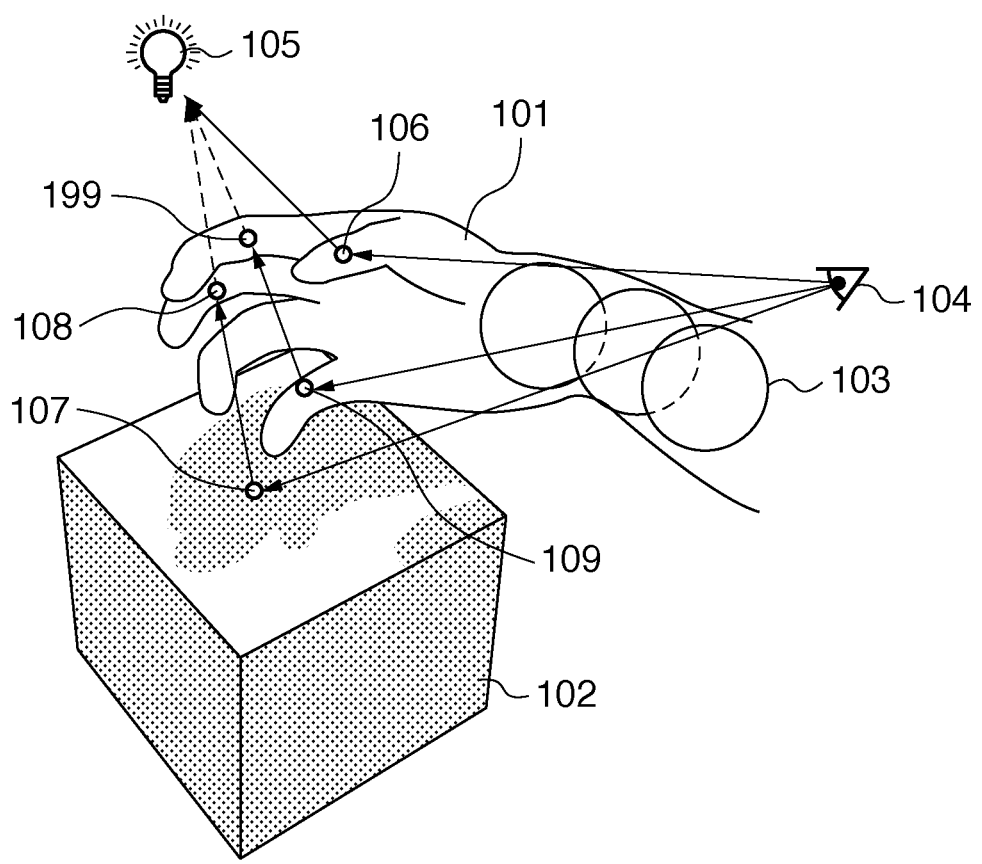
FIG. 1 is a view showing a problem which may be posed when rays are cast based on a ray tracing method.

FIG. 1 is a view for explaining a problem which may be posed when rays are cast based on the ray tracing method. FIG. 1 shows a scene in which a hand 101 as a physical object casts a shadow over a virtual object 102 using a plurality of virtual elements 103 which are combined to approximate the shape of the hand 101, so as to present as if the hand 101 were casting a shadow over the virtual object 102.

Note that the virtual elements 103 are used to express the shape of the hand 101 by a plurality of virtual objects, and the hand 101 is expressed as a set of virtual spheres in FIG. 1. That is, in FIG. 1, one sphere corresponds to one virtual element 103. Note that FIG. 1 shows not all the virtual elements 103 but only those which configure a part of the hand 101. In practice, a plurality of virtual elements 103 having different sizes configure the hand 101.

Upon generation of a virtual space image according to this embodiment, expressions of shadows and reflections which may be generated between virtual objects, between physical objects, and between virtual and physical objects are handled as follows.

A shadow and reflection from a virtual object to another virtual object are expressed by a rendering method based on general ray tracing.

A shadow and reflection from a virtual object to a physical object are expressed in such a manner that the virtual object exerts influences of a shadow and reflection onto an approximate virtual object.

A shadow and reflection from a physical object to a virtual object are expressed in such a manner that an approximate virtual object exerts influences of a shadow and reflection onto the virtual object.

A shadow and reflection from a physical object to another physical object use an image of the physical space intact without using the approximate virtual object.

In FIG. 1, reference numeral 104 denotes a viewpoint (virtual viewpoint) laid out on the virtual space at the position and orientation of the viewpoint of the viewer. According to the ray tracing method, rays corresponding to respective pixels of a virtual space image to be generated are generated from that virtual viewpoint 104. One of the generated rays intersects with the virtual element 103 at an intersection point 106. By sequentially tracing a route of the ray reflected at the intersection point 106, a virtual light source 105 that exerts an influence on the intersection point 106 is searched. As a result of such light source search, the reflected ray reaches the virtual light source 105. There is no shield between the intersection point 106 and virtual light source 105. That is, there are neither a shadow nor reflection that exert an influence on the intersection point 106. Therefore, as for a pixel corresponding to the intersection point 106 on the virtual space image, a positionally corresponding pixel on an image of the physical space, which is captured from the same viewpoint as the virtual space image, can be used intact.

Another one of the rays generated from the virtual viewpoint 104 intersects with the virtual element 103 at an intersection point 107. An intersection point 108 is a point where the ray reflected at the intersection point 107 intersects with the virtual element 103 before it reaches the virtual light source 105. In this case, since a ray coming from the virtual light source 105 is intercepted by the virtual element 103, the influence of a shadow of the virtual element 103 has to be considered so as to determine a pixel value of a pixel on the virtual space image corresponding to the intersection point 107. As a result, the pixel value of the pixel on the virtual space image corresponding to the intersection point 107 becomes darker by an amount corresponding to light coming from the virtual light source 105, which is intercepted by the physical object 101. That is, in order to calculate the pixel value of the pixel on the virtual space image corresponding to the intersection point 107, a pixel value free from the influence of the virtual element 103 is calculated first (to calculate the pixel value at the position of the intersection point 107 on the virtual object 102 when no virtual element 103 exists). After that, the influence of a shadow of the virtual element 103 is calculated, and the final pixel value at the position of the intersection point 107 is determined.

Still another one of the rays generated from the virtual viewpoint 104 intersects with the virtual element 103 at an intersection point 109. An intersection point 199 is a point where the ray reflected at the intersection point 109 intersects with the virtual element 103 before it reaches the virtual light source 105. In this case, since a ray coming from the virtual light source 105 is intercepted by the virtual element 103, the influence of a shadow of the virtual element 103 has to be considered so as to determine a pixel value of a pixel on the virtual space image corresponding to the intersection point 109. Furthermore, since the intersection point 109 also receives an influence of a shadow due to "overlapping of fingers", that is, that of the little finger and medicinal finger as physical objects on the physical space, it has a pixel value darker than real darkness. For this reason, since a shadow calculation is made at the intersection point on the virtual object that does not require any virtual shadow calculation in practice, that part becomes unnaturally darker than neighboring pixels, thus impairing reality.

Since a part where a real shadow produced inside the physical object 101 and a shadow of the virtual element 103 exert influences each other like the intersection point 109 becomes darker more than necessary, an optically incorrect shadow is rendered.

Figure 2:
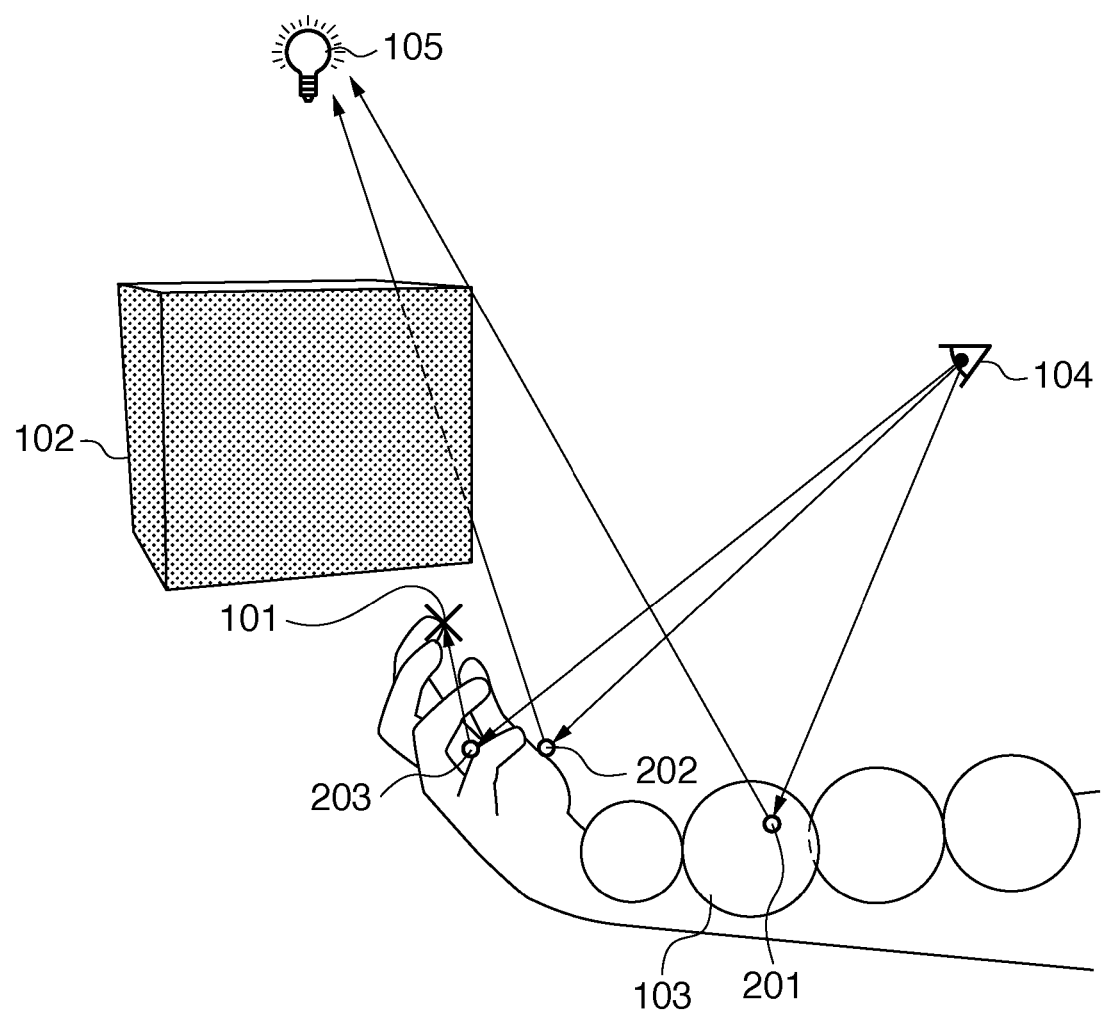
FIG. 2 is a view showing a problem which may be posed when rays are cast based on the ray tracing method.

FIG. 2 is a view showing a problem which may be posed when rays are cast based on the ray tracing method. FIG. 2 shows a scene in which the virtual object 102 casts a shadow over the hand 101 using a plurality of virtual elements 103 which are combined to approximate the shape of the hand 101, so as to present as if the virtual object 102 were casting a shadow over the hand 101 as a physical object. That is, in FIG. 2, the relationship between the hand 101 and virtual object 102 is opposite to that between the hand 101 and virtual object 102 shown in FIG. 1.

One of the rays generated from the virtual viewpoint 104 intersects with the virtual element 103 at an intersection point 201. By sequentially tracing a route of the ray after it is reflected at the intersection point 201, the virtual light source 105 that exerts an influence on the intersection point 201 is searched. As a result of such light source search, the reflected ray reaches the virtual light source 105. Note that there is no shield between the intersection point 201 and virtual light source 105. That is, there are neither a shadow nor reflection that exert an influence on the intersection point 201. Therefore, as for a pixel corresponding to the intersection point 201 on the virtual space image, a positionally corresponding pixel on an image of the physical space, which is captured from the same viewpoint as the virtual space image, can be used intact.

Another one of the rays generated from the virtual viewpoint 104 intersects with the virtual element 103 at an intersection point 202. The ray reflected at the intersection point 202 intersects with the virtual object 102 before it reaches the virtual light source 105. In this case, since a ray coming from the virtual light source 105 for the intersection point 202 is intercepted by the virtual object 102, the influence of a shadow of the virtual object 102 has to be considered so as to determine a pixel value of a pixel on the virtual space image corresponding to the intersection point 202. That is, in order to determine the pixel value of the pixel of the intersection point 202, a pixel value obtained by adding the calculation result of the influence of a shadow exerted by the virtual object 102 to a pixel value of a positionally corresponding pixel on the physical space image captured from the same viewpoint as the virtual space image is used.

Still another one of the rays generated from the virtual viewpoint 104 intersects with the virtual element 103 at an intersection point 203. The ray reflected at the intersection point 203 intersects with the virtual element 103 before it reaches the virtual light source 105. The intersection point 203 is a part where a self-shadow is generated on the hand 101, and a part influenced by a real shadow on the physical space image. Since the ray reflected at the intersection point 203 intersects with the virtual element 103 again, the pixel value at the intersection point 203 will be determined as follows according to the above description. That is, a pixel value obtained by adding the influence of a shadow of the virtual element 103 to the pixel value of the positionally corresponding pixel on the physical space image captured from the same viewpoint as the virtual space image is that at the intersection point 203. However, when the pixel value at the intersection point 203 is determined in this way, the final pixel value is obtained by further adding the influence of a shadow on the virtual space image to the pixel value of the physical space image influenced by the real shadow. As a result, the pixel value at the intersection point 203 becomes optically incorrect in the same manner as the intersection point 109.

Figure 3:
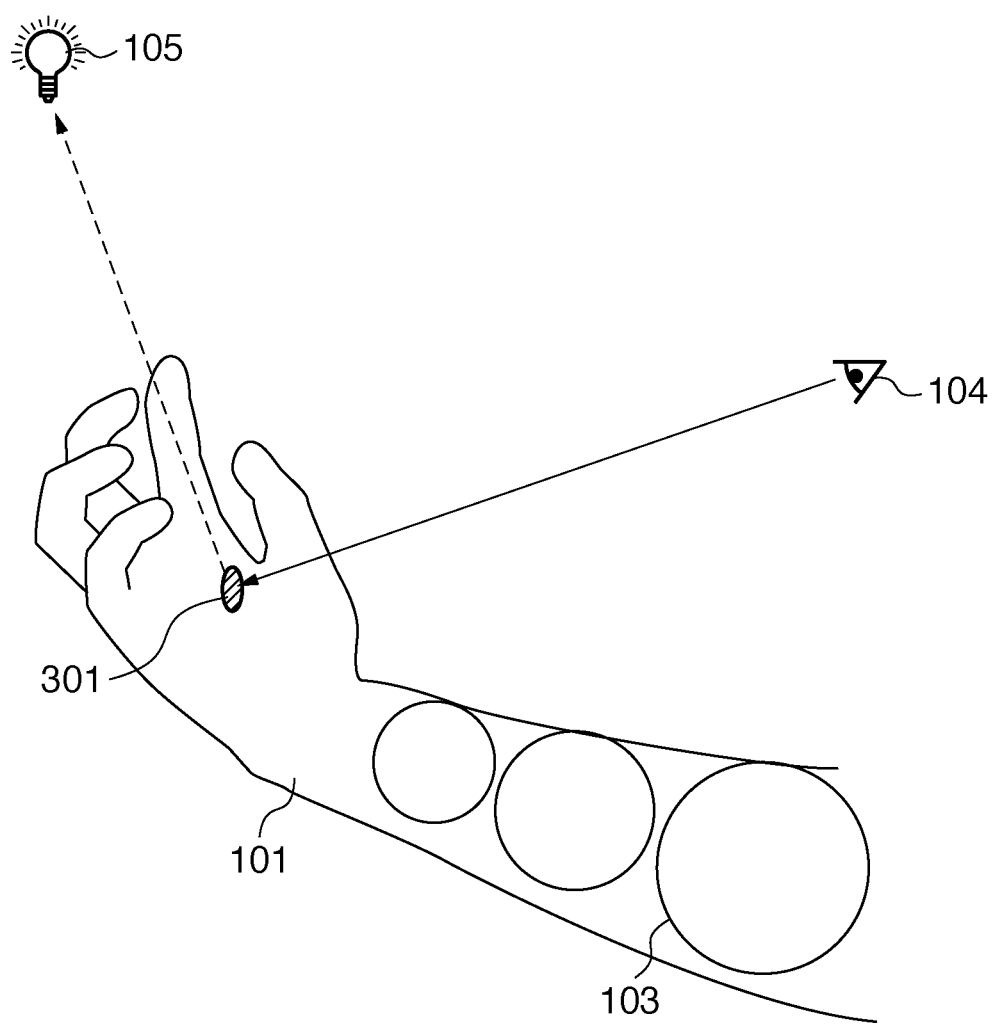
FIG. 3 is a view showing a problem which may be posed when rays are cast based on the ray tracing method.

FIG. 3 is a view showing a problem which may be posed when rays are cast based on the ray tracing method. FIG. 3 shows an example in which an optical inconsistency occurs due to a self-shadow generated inside the virtual element 103.

It is almost impossible for the existing 3D measurement technique and light source estimation technique to faithfully reproduce a physical environment. For this reason, the shape of an approximate virtual object configured using the virtual elements 103 is not always strictly equal to that of the physical object 101. That is, a virtual shadow which does not exist physically is rendered while being superposed on the physical space image as a background, depending on the layout method of virtual light sources and the approximation precision of the approximate virtual object. An intersection point 301 is a point where since a ray generated from the virtual viewpoint 104 is internally reflected a plurality of times on the virtual element 103, a self shadow is consequently produced, thus causing an optical inconsistency.

The problems which may occur when rays are cast based on the ray tracing method, that is, those which may occur when rays are generated from the virtual viewpoint based on the ray tracing method after the virtual elements 103 are laid out on the virtual space have been explained using FIGS. 1 to 3. As described above, problems have occurred at the intersection points 109 and 203 since the rays generated from the virtual viewpoint 104 successively intersect with the virtual elements 103.

This embodiment solves any optical inconsistency that occurs when a ray generated from the virtual viewpoint 104 successively intersects with the virtual elements 103.

Figure 4:
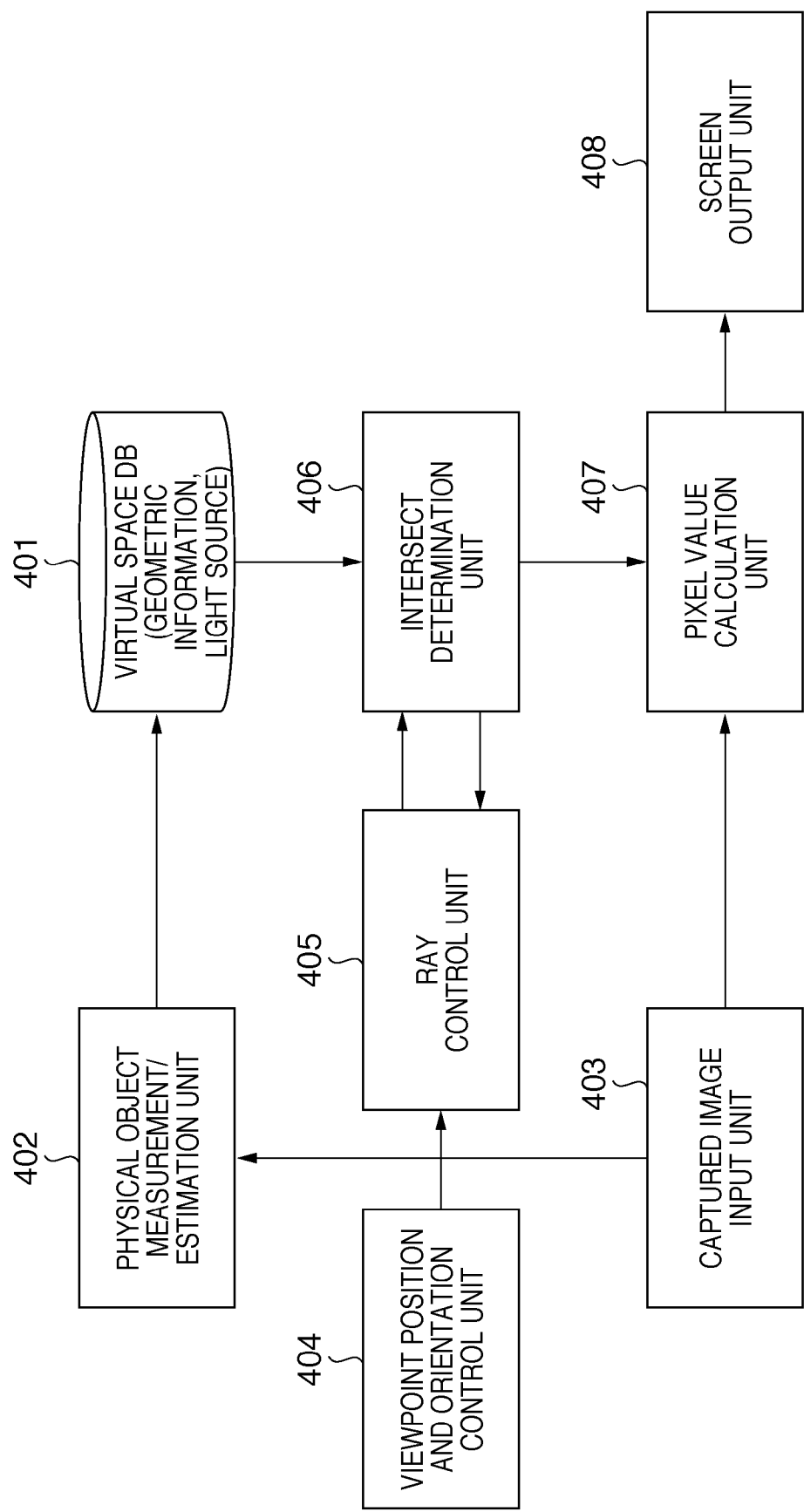
FIG. 4 is a block diagram showing the functional arrangement of an image processing apparatus according to the first embodiment of the present invention.

FIG. 4 is a block diagram showing the functional arrangement of an image processing apparatus according to this embodiment.

A virtual space database (DB) 401 is a database which stores and holds various kinds of information including virtual object information such as shape information, position and orientation information, material information, and the like of each virtual object, virtual light source information, and virtual viewpoint information. Information stored and held in the virtual space DB 401 can be changed as needed by a user's operation input or according to the sequence of processing. For example, the user can change the position and orientation information and material information of each virtual object by his or her operations. More specifically, the virtual space DB 401 always holds the latest information in association with the virtual objects, viewpoint, and light source.

A physical object measurement/estimation unit 402 measures or estimates physical object information such as shape information, position and orientation information, material information, and the like of a physical object, and virtual light source information. The physical object measurement/estimation unit 402 outputs the estimated physical object information and virtual light source information to the virtual space DB 401. In this embodiment, the physical object measurement/estimation unit 402 executes depth estimation by stereo matching using a physical space image acquired by a captured image input unit 403. The physical object measurement/estimation unit 402 estimates the 3D shape based on the result obtained by the depth estimation. Since the measurement/estimation method of a physical object executed by the physical object measurement/estimation unit 402 uses a known technique, a detailed description of the operation of the physical object measurement/estimation unit 402 will not be given. An operation example of the physical object measurement/estimation unit 402 includes 3D reconstruction based on stereo matching using a plurality of cameras, a measurement/estimation method using a measurement device such as a 3D rangefinder or the like, and so forth.

The captured image input unit 403 acquires, as data, an image of the physical space, which is captured by a video camera equipped on an HMD (Head Mounted Display) mounted on the head of the user who observes a composite image of the physical space image and virtual space image. The video camera captures a movie of the physical space, and the captured frame images (physical space images) are sequentially input to the captured image input unit 403. The captured image input unit 403 supplies each physical space image received from the video camera to the physical object measurement/estimation unit 402 and a pixel value calculation unit 407.

A viewpoint position and orientation control unit 404 acquires position and orientation information of the video camera (that of the viewpoint), and sets the acquired position and orientation information as that of a viewpoint (virtual viewpoint) to be set on the virtual space. Various methods of acquiring the position and orientation information of the video camera by the viewpoint position and orientation control unit 404 are available. For example, a six-degrees-of-freedom sensor may be attached to the video camera, and the position and orientation information of the virtual viewpoint calculated by a sensor controller based on the measurement values of the six-degrees-of-freedom sensor may be acquired. Alternatively, two-dimensional markers may be laid out on the physical space, an image of that physical space may be acquired from the video camera, and the position and orientation information of the virtual viewpoint may be calculated using the acquired physical space image. Since these methods exemplified as the method of acquiring the position and orientation information of the virtual viewpoint are state-of-the-art techniques, no more detailed explanation will be given.

A ray control unit 405 generates rays from the virtual viewpoint, and controls the subsequent routes of the rays, so as to calculate ray information converging from a virtual light source to the virtual viewpoint according to a known ray tracing method. The ray tracing method is an algorithm which calculates a route searched from the virtual viewpoint to an intersection point between a ray that passes through a given pixel on a virtual screen, and a virtual object, and from that intersection point to the virtual light source, thereby calculating a pixel value of that pixel. Details of the ray tracing method will be described later.

Furthermore, when a ray intersects with a virtual object, the ray control unit 405 sets that intersection point as a start point, and generates a new ray from that start point, so as to calculate a shadow, reflection, and refraction based on material information of the virtual object. Note that a ray generated from the virtual viewpoint is called a primary ray, and the order of the ray increases with increasing number of times of reflection or refraction. That is, a ray which is reflected once is called a secondary ray, and a ray which is reflected twice is called a ternary ray. The ray control unit 405 stops generation of a new ray when the ray is cast to infinity, when it reaches the virtual light source, and when the unit 405 receives a stop instruction from an intersect determination unit 406.

The intersect determination unit 406 determines a virtual object of those laid out on the virtual space (virtual objects laid out based on the virtual object information stored and held in the virtual space DB 401), with and by which a ray generated by the ray control unit 405 intersects and is reflected. When the intersect determination unit 406 determines that a ray successively intersects with an approximate virtual object, it sends a stop instruction to the ray control unit 405.

The pixel value calculation unit 407 calculates a pixel value at a pixel position where a ray generated from the virtual viewpoint intersects on the virtual screen, based on the determination result of the intersect determination unit 406 in accordance with the ray tracing algorithm (details will be described later). When a ray does not intersect with any virtual object or when there is no influence of a shadow or reflection although a ray intersects with an approximate virtual object, the pixel value calculation unit 407 determines the pixel value at the pixel position where that ray intersects on the virtual screen, as follows. That is, the pixel value calculation unit 407 uses a pixel value at a pixel position corresponding to that pixel position on the physical space image acquired by the captured image input unit 403, as the pixel value at the pixel position where the ray intersects on the virtual screen. When a ray intersects with an approximate virtual object and, as a result, there is an influence of a shadow or reflection, the pixel value calculation unit 407 acquires, on the physical space image acquired by the captured image input unit 403, a pixel value of a pixel position corresponding to the pixel position where that ray intersects on the virtual screen. The pixel value calculation unit 407 then adds a pixel value that considers the influence of a shadow or reflection to the acquired pixel value, thereby determining a final pixel value.

When it is determined that a ray intersects with a virtual object, and there is no shield that intercepts light coming from the virtual light source, the pixel value calculation unit 407 calculates reflection or refraction based on material information of that virtual object. Then, the pixel value calculation unit 407 adds the shadow calculation result to that calculation result to obtain the pixel value as that at the pixel position where the ray intersects on the virtual screen. The calculation in this case follows the known ray tracing algorithm.

When it is determined that a ray intersects with a virtual object, and an approximate virtual object intercepts light from the virtual light source, the pixel value calculation unit 407 calculates reflection or refraction of the ray with respect to the virtual object, and then calculates the influence of a shadow of the approximate virtual object. In this way, the pixel value calculation unit 407 calculates the pixel value at the pixel position where that ray intersects on the virtual screen.

When it is determined that a ray is cast to infinity, the pixel value calculation unit 407 acquires a pixel value at a pixel position corresponding to the pixel position where that ray intersects on the virtual screen on the physical space image acquired by the captured image input unit 403. Then, the pixel value calculation unit 407 determines the acquired pixel value as the pixel value at the pixel position where that ray intersects on the virtual screen.

When a ray intersects with an approximate virtual object, and the virtual light source is intercepted by another virtual object during the process of a light source search, the pixel value calculation unit 407 acquires, on the physical space image acquired by the captured image input unit 403, a pixel value at a pixel position corresponding to the pixel position where that ray intersects on the virtual screen. Then, the pixel value calculation unit 407 determines a final pixel value by adding a pixel value that considers the influence of a shadow or reflection to the acquired pixel value.

Note that the pixel value calculation unit 407 executes such pixel value determination (calculation) processing for respective pixels (those on the virtual screen) that form the virtual space image. In this way, the pixel value calculation unit 407 can generate a virtual space image for one frame. The pixel value calculation unit 407 outputs the generated virtual space image to a subsequent screen output unit 408.

The screen output unit 408 composites the virtual space image received from the pixel value calculation unit 407 with the above physical space image to generate a composite image, and outputs the composite image to a display device of the HMD.

Figure 5:
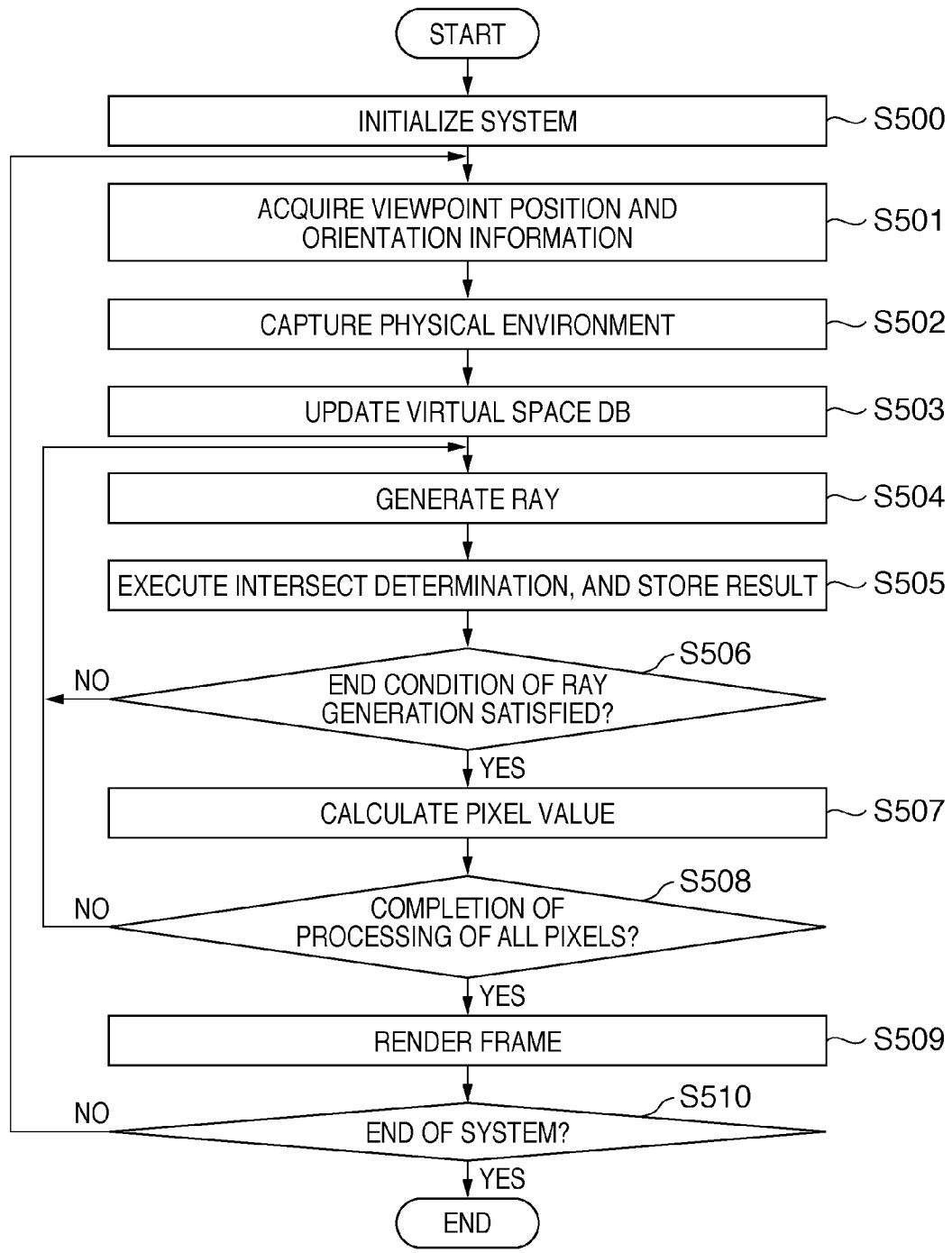
FIG. 5 is a flowchart of processing executed by the image processing apparatus according to the first embodiment of the present invention so as to generate a virtual space image based on the ray tracing method.

FIG. 5 is a flowchart of processing executed by the image processing apparatus according to this embodiment so as to generate a virtual space image based on the ray tracing method. Note that the image processing apparatus of this embodiment acquires a physical space image parallel to the processing according to the flowchart shown in FIG. 5. Therefore, the processing to be executed by the image processing apparatus according to this embodiment is not only that according to the flowchart shown in FIG. 5. In the following description, of the processing to be executed according to the flowchart of FIG. 5, processing executed when a ray intersects with an approximate virtual object will be mainly explained. Therefore, descriptions of other situations will be simply described or will not be given.

In step S500, the respective units other than the virtual space DB 401 execute initialization processing. The initialization processing is different for the respective units. For example, in the initialization processing, a storage area required to execute the subsequent processes is assured.

In step S501, the viewpoint position and orientation control unit 404 acquires the position and orientation information of the viewpoint. The viewpoint position and orientation control unit 404 outputs the acquired position and orientation information of the viewpoint to the virtual space DB 401.

In step S502, the physical object measurement/estimation unit 402 estimates physical object information (shape information, position and orientation information, material information, and the like) of a physical object that appears in a physical space image using the physical space image acquired by the captured image input unit 403, and virtual light source information. Since such estimation technique is a state-of-the-art technique, a description thereof will not be given.

When the direction and density of a shadow generated due to the influence of a light source based on the estimated virtual light source information are far from those of a shadow generated due to the influence of a physical light source, a serious cause for impairing reality is posed. Therefore, it is desired to faithfully reflect information of the position, direction, and intensity of the physical light source on the virtual space. As a method of reproducing a physical light source environment on the virtual space, various methods have been proposed. For example, in one technique, highlight components are extracted from the physical space image acquired by the captured image input unit 403 and undergo principal component analysis, thereby calculating and estimating physical light source information (position, direction, and intensity). In this way, since the acquisition method of a 3D shape and the light source estimation method of a physical environment have been variously proposed, suited methods can be selected according to a system to be built.

The physical object measurement/estimation unit 402 then outputs the estimated information to the virtual space DB 401.

In step S503, the virtual space DB 401 overwrites and saves the information output in steps S501 and S502 on the information held so far, thus updating the information stored and held within itself.

The virtual space DB 401 sets the position and orientation information of the viewpoint acquired from the viewpoint position and orientation control unit 404 in step S501 as that of the virtual viewpoint. The virtual space DB 401 stores and holds the set position and orientation information.

The virtual space DB 401 configures an approximate virtual object based on the physical object information acquired from the physical object measurement/estimation unit 402 in step S502 (to generate the approximate virtual object by combining virtual elements), and lays it out at a position and orientation indicated by the position and orientation information in the physical object information. Note that each virtual element may be a point having 3D position information alone or a triangular patch generated by a set of such points. More specifically, the approximate virtual object may be configured by either a point group or polygon group. However, in an image generation method based on the ray tracing method, a virtual object need not always be configured by polygons.

In general, since intersect determination processing between a ray and sphere is very fast and does not incur a high calculation cost, this embodiment assumes that each virtual element is a sphere having an arbitrary radius parameter. Therefore, assume that the approximate virtual object is a virtual object which approximates the shape of a physical object using a plurality of spheres each having an arbitrary radius parameter. However, the approximate virtual object may be configured using polygons or based on metaball expression.

In step S503, virtual light sources are set on the virtual space based on the virtual light source information acquired in step S502. That is, the light sources on the physical space are simulated on the virtual space. Note that light sources corresponding to all pieces of virtual light source information acquired in step S502 cannot be set on the virtual space due to the computation performance and memory performance of the image processing apparatus. In such case, a light source having a highest contribution ratio (luminance value) on the physical space may be preferentially laid out on the virtual space. Of course, the present invention is not limited to such specific method.

In step S503, the virtual space DB 401 also lays out virtual objects (for example, the virtual object 102 in FIG. 1) other than the approximate virtual object on the virtual space.

In step S504, the ray control unit 405 generates a ray from a position currently set as a starting point according to the ray tracing method. When the process in step S504 is executed for the first time, the ray control unit 405 generates, from the virtual viewpoint set in step S503, a ray that passes through a pixel position, the pixel value of which is to be determined, on the virtual screen.

Note that the ray tracing method is an algorithm for calculating a pixel value of each pixel on the virtual screen by calculating a ray that passes through the virtual screen to have the virtual viewpoint as a starting point, so as to calculate a ray coming at the virtual viewpoint.

The ray tracing method will be described in more detail below.

Figure 6:
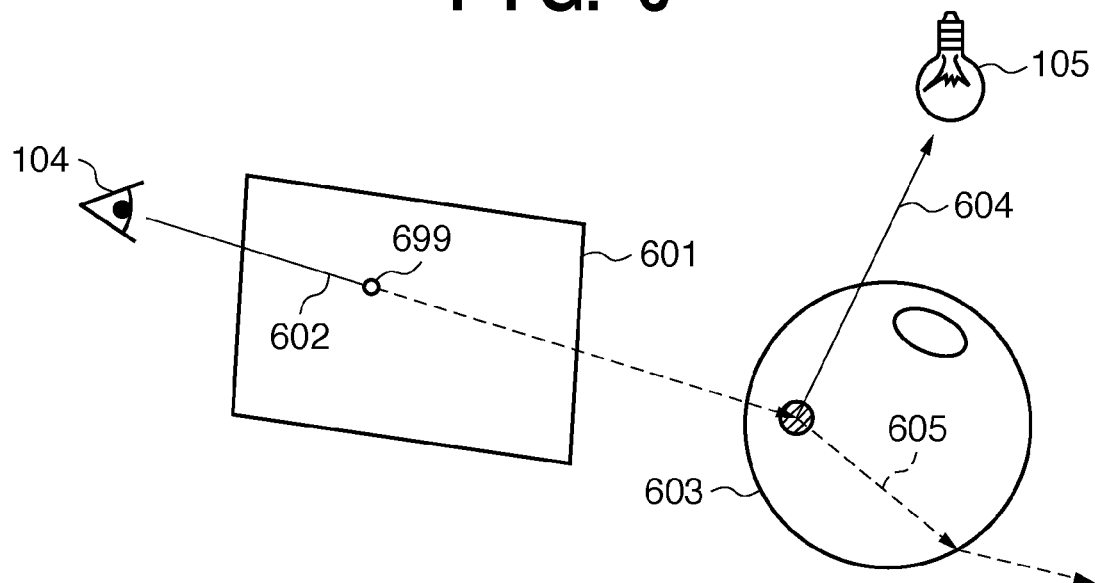
FIG. 6 is a view for explaining a mechanism for generating an image based on the ray tracing method.

FIG. 6 is a view for explaining a mechanism of generating an image based on the ray tracing method.

Referring to FIG. 6, reference numeral 601 denotes a virtual screen. By executing the following processing for a ray which comes from the virtual viewpoint 104 and passes through each pixel position on the virtual screen 601, pixel values at respective pixel positions can be calculated. As a result, an image for one frame can be generated on the virtual screen 601. In the following description, a ray which comes from the virtual viewpoint 104 and passes through one point (a pixel position 699) on the virtual screen 601 will be explained. Therefore, by applying the following description to respective pixel positions on the virtual screen 601, an image for one frame can be generated on the virtual screen 601.

In the ray tracing method, a ray 602 is cast from the virtual viewpoint 104 toward one point (pixel position 699) on the virtual screen 601, and a cast destination is searched to check if a virtual object exists. In FIG. 6, a virtual object 603 exists at the cast destination of the ray 602. Therefore, in this case, a pixel value (luminance) at the pixel position 699 on the virtual screen 601 is calculated based on the material information, surface state, and the like of the virtual object 603. Note that when the ray 602 intersects with the virtual object 603, a transmitting ray 605 and reflected ray 604 are calculated. Hence, whether or not a virtual object exists ahead of each ray is similarly checked for these rays (transmitting ray 605 and reflected ray 604) in turn.

The principle of the ray tracing method has been described above. The sequence of the ray tracing method can be briefly summarized as follows.

(1) A virtual viewpoint and virtual screen are set.

(2) A pixel position where a pixel value (luminance) is to be determined on the virtual screen is determined.

(3) A ray that passes through the pixel position determined in (2) is cast from the virtual viewpoint.

(4) A virtual object that intersects with the cast ray is searched (intersect determination).

(5) As a result of search, when the virtual object that intersects with the ray is found, the pixel value (luminance) of a pixel at the pixel position is determined in consideration of an illumination effect at that intersection point, the material of the virtual object, and the like.

(6) A ray is further cast from the intersection point found first in accordance with the reflectance and transmittance of the virtual object, and the process in (4) and subsequent processes are repeated.

The intersect determination process in (4) consists mostly of those in (1) to (6). The intersect determination process that has been conventionally executed will be described below using a practical example.

Let (Vx, Vy, Vz) be a coordinate position V of the virtual viewpoint, and (x1, y1, z1) be a pixel position S where a luminance value is to be determined on the virtual screen.

In this case, equations that express a ray which comes from the coordinate position V of the virtual viewpoint and passes through the pixel position S can be described using an intervening variable t by:

$$X = Ax \cdot t + Vx$$

$$Y = Ay \cdot t + Vy$$

$$Z = Az \cdot t + Vz \qquad (1)$$

where A=(Ax, Ay, Az) is a direction vector of the ray, and is calculated by:

$$(Ax, Ay, Az) = (x1 - Vx, y1 - Vy, z1 - Vz) \qquad (2)$$

If a virtual element as a spherical body is a sphere having radius r and a central coordinate position (x0, y0, z0), that sphere can be expressed by:

$$(x-x0)^2 + (y-y0)^2 + (z-z0)^2 = r^2 \qquad (3)$$

Then, substitution of equations (1) that express the ray into equation (3) that expresses the virtual element yields:

$$(Ax \cdot t + Vx - x0)^2 + (Ay \cdot t + Vy - y0)^2 + (Az \cdot t + Vz - z0)^2 = r^2 \qquad (4)$$

By arranging this equation (4), the following quadratic equation for t is obtained:

$$at^2+bt+c=0 \quad (5)$$

for a, b, and c are respectively given by:

$$a=Ax^2+Ay^2+Az^2$$

$$b=2\{Ax(Vx-x0)+Ay(Vy-y0)+Az(Vz-z0)\}$$

$$c=(Vx-x0)^2+(Vy-y0)^2+(Vz-z0)^2$$

Therefore, by calculating a determination formula for quadratic equation (5), whether or not quadratic equation (5) has real roots can be determined. If the number of real roots is one or more (the result of the determination formula is 0 or more), it is determined that the ray and sphere intersect with each other; if the number of real roots is zero (the result of the determination formula is less than 0), it is determined that the ray and sphere do not intersect. If it is determined that the ray and sphere intersect with each other, the coordinate value of the intersection point needs to be calculated. In this case, the coordinate value of the intersection point is calculated as follows. That is, equation (5) is solved for t to calculate the value of t, and that value of t is substituted in equations (1). Then, X, Y, and Z of the left-hand sides are respectively the x-, y-, and z-coordinate values of the intersection point.

When two intersection points are determined, an intersection point closer to the viewpoint is adopted in the subsequent processes. In other words, when equation (5) is solved for t to yield two values of t, the coordinate value of the intersection point is calculated using the smaller value of t.

Note that the calculated value t represents the distance from the virtual viewpoint to the sphere. When this sphere is a virtual object located at a position closest to the virtual viewpoint, this sphere is a virtual object which is displayed in association with the intersection point determined based on the calculated t. However, another virtual object located at a position closer to the virtual viewpoint may exist. Hence, the intersect determination is similarly executed for the other virtual object. If it is determined that the ray intersects with the other virtual object, a distance from the virtual viewpoint is calculated, and is compared with that of the former virtual object.

In this way, which virtual object is to be displayed can be determined for respective pixel positions on the virtual screen. As a result, the pixel values can be calculated for respective pixel positions on the virtual screen.

Note that the aforementioned ray tracing method is a state-of-the-art technique, as described above.

Referring back to FIG. 5, in step S505 the intersect determination unit 406 executes intersect determination of the ray generated in step S504 and a virtual object using the aforementioned equations. Note that the intersect determination unit 406 records various kinds of information obtained in the intersect determination (information indicating whether or not a virtual object which intersects with the ray is an approximate virtual object, the coordinate value of an intersection point, and the like) on a memory. If a target object with which the ray intersects is an approximate virtual object, the intersect determination unit 406 sets an intersect determination flag to ON (e.g., it sets "1" in the value of the intersect determination flag). On the other hand, if a target object with which the ray intersects is not an approximate virtual object (for example, the virtual object 102 in FIG. 1), the intersect determination unit 406 sets an intersect determination flag to OFF (e.g., it sets "0" in the value of the intersect determination flag).

The intersect determination unit 406 checks in step S506 if a ray is generated again. The determination condition as to whether or not to generate the ray again is that as to whether or not the ray successively intersects with the approximate virtual object. Therefore, if the intersect determination flag at the beginning of the process in step S506 is ON, and if it is determined as a result of the next process in step S506 that a target object with which the ray intersects is the approximate virtual object, it can be determined that the ray successively intersects with the approximate virtual object. Of course, a method of determining whether or not a ray successively intersects with the approximate virtual object is not limited to such specific method.

If the ray successively intersects with the approximate virtual object, the intersect determination unit 406 instructs the ray control unit 405 to abort generation processing of rays, so as to prevent the influence of a shadow of the approximate virtual object with which the ray intersects the second time from being exerted. More specifically, the intersect determination unit 406 controls the ray control unit 405 so as to control the pixel value calculation unit 407 to calculate the pixel value corresponding to the ray based on the ray until the first intersect (predetermined intersect state). After that instruction, the process advances to step S507 to calculate a pixel value.

At this time, the intersect determination unit 406 discards information calculated for the second intersect, and notifies the pixel value calculation unit 407 of information calculated for the first intersect with the approximate virtual object (information required to calculate a pixel value corresponding to an intersection point based on that intersect). That information is as described above, and is known. In this manner, since a shadow from the approximate virtual object with which the ray intersects second time can be suppressed, an optical inconsistency due to a self-shadow can be prevented.

On the other hand, if the ray does not successively intersect with the approximate virtual object, the intersect determination unit 406 instructs the ray control unit 405 to generate a ray, so as to make a shadow calculation and reflection/refraction calculation based on the secondary ray. After that instruction, the process returns to step S504, and the ray control unit 405 generates a ray again.

As described above, the processing for generating a ray is recursively repeated until the ray satisfies the following conditions. That is, when the intersect determination unit 406 determines that one of the following three conditions is satisfied, it instructs the ray control unit 405 to stop generation of a ray.

(1) A ray reaches the virtual light source.
(2) A ray successively intersects with the approximate virtual object.
(3) A ray approaches infinite distance.

Upon completion of a series of ray tracing processes, the process advances to step S507 to calculate a pixel value, and the pixel value calculation unit 407 makes a calculation.

In step S507, the pixel value calculation unit 407 calculates a pixel value based on the ray tracing result of the intersect determination unit 406. The ray tracing result includes "material information of the virtual object that intersects with the ray" and "information of the intersection point at which the ray and virtual object intersect", which are obtained by the intersect determination unit 406 in step S505. The pixel value calculation unit 407 calculates a pixel value at an intersection point where the ray intersects with the virtual object based on these pieces of information. The calculation method of the pixel value will be briefly described below. The material information of the virtual object includes information such as diffuse reflection components, mirror reflection components, environment light, self-luminous components, and the like. Therefore, a pixel value can be calculated by calculating these pieces of material information, the directions of normal of the virtual object at the intersection point, and information (type, position and orientation, luminance information) of the virtual light source. The calculation method of the pixel value at the intersection point is a general method in computer graphics, and a description of a detailed pixel value calculation method will not be given.

If the pixel values of all pixels on the virtual screen are calculated, the process advances to step S509 via step S508. On the other hand, if pixels whose pixel values are to be calculated still remain, the process returns to step S504 via step S508, and the subsequent processes are executed based on a ray that comes from the virtual viewpoint and passes through a pixel position where a pixel value is not calculated yet.

In step S509, the pixel value calculation unit 407 outputs a virtual space image for one frame generated by calculating the pixel values for all the pixels to the screen output unit 408. The screen output unit 408 composites this virtual space image with the physical space image, and outputs a composite image (MR image) obtained by this composition to the display device of the HMD.

If the user makes an operation input to end this processing or if a condition required to end this processing is met, this processing ends via step S510. On the other hand, if the user does not make any operation input to end this processing and the condition required to end this processing is not met, the process returns to step S501 via step S510, thus repeating the subsequent processes.

As described above, according to this embodiment, an optical inconsistency that occurs when a ray successively intersects with the approximate virtual object can be solved. More specifically, to solve such an inconsistency, after the ray successively intersects with the approximate virtual object, generation of the ray is controlled to prevent the influence of an unnecessary shadow from being exerted on the approximate virtual object.

In this embodiment, the approximate virtual object is expressed as a set of spheres. Alternatively, the approximate virtual object may be expressed as a set of polygons.

In this embodiment, a plurality of virtual elements which is combined to approximate the shape of the hand are used as the approximate virtual object. However, a target object to be approximated may be other than the hand.

[Second Embodiment]

In the first embodiment, in order to solve an optical inconsistency that occurs when a ray successively intersects with an approximate virtual object, generation of a ray after the ray successively intersects is suppressed. However, an optical inconsistency does not always occur even when the ray successively intersects with the approximate virtual object.

Figure 7:
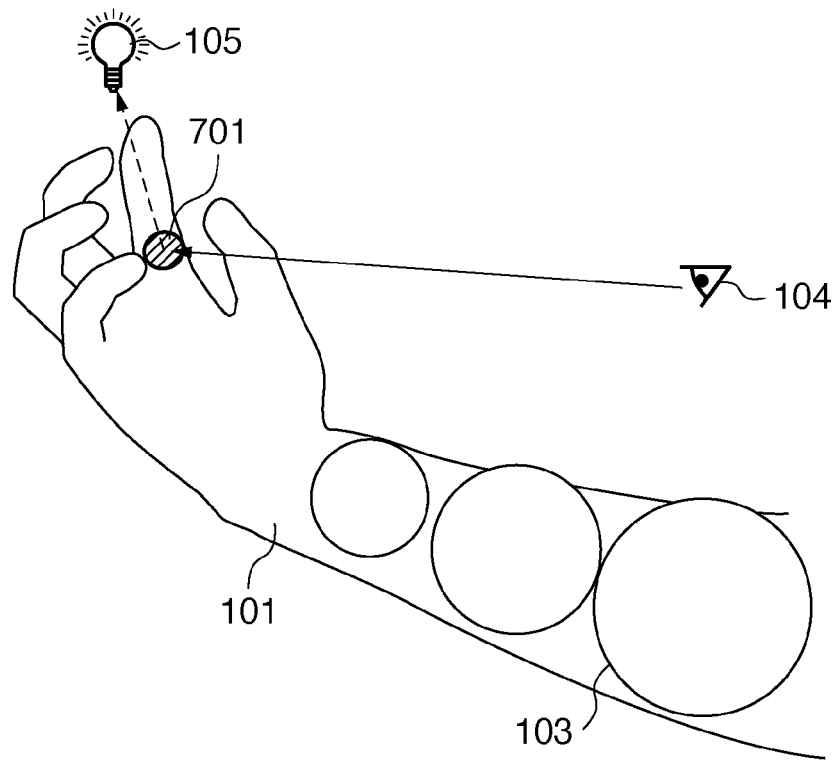
FIG. 7 is a view for explaining a case in which an optical inconsistency occurs when a ray successively intersects with an approximate virtual object and generation of that ray is suppressed.

FIG. 7 is a view for explaining a case in which an optical inconsistency occurs upon suppression of generation of a ray when the ray successively intersects with the approximate virtual object.

In FIG. 7, a ray generated from the virtual viewpoint 104 intersects with a virtual element 103 at an intersection point 701, and this ray successively intersects with another virtual element 103. In such case, in the first embodiment, generation of the ray from the intersection point 701 is suppressed. However, if such suppression is made, since a shadow calculation is skipped for a region that should be dark due to a shadow in practice, the corresponding pixel becomes brighter than surrounding pixels. As a result, a bright pixel value locally appears in a region where a uniform shadow has to be formed normally. Thus, the reality for the user deteriorates very much.

In the second embodiment, even when a ray successively intersects with virtual elements 103, generation of the ray is not suppressed, and generation of a ray and intersect determination are recursively repeated. Then, when the end condition of the algorithm in the general ray tracing method is satisfied, a final pixel value is calculated by tracing back the intersect determination log.

In this embodiment as well, the same image processing apparatus shown in FIG. 4 as in the first embodiment is used.

Figure 8:
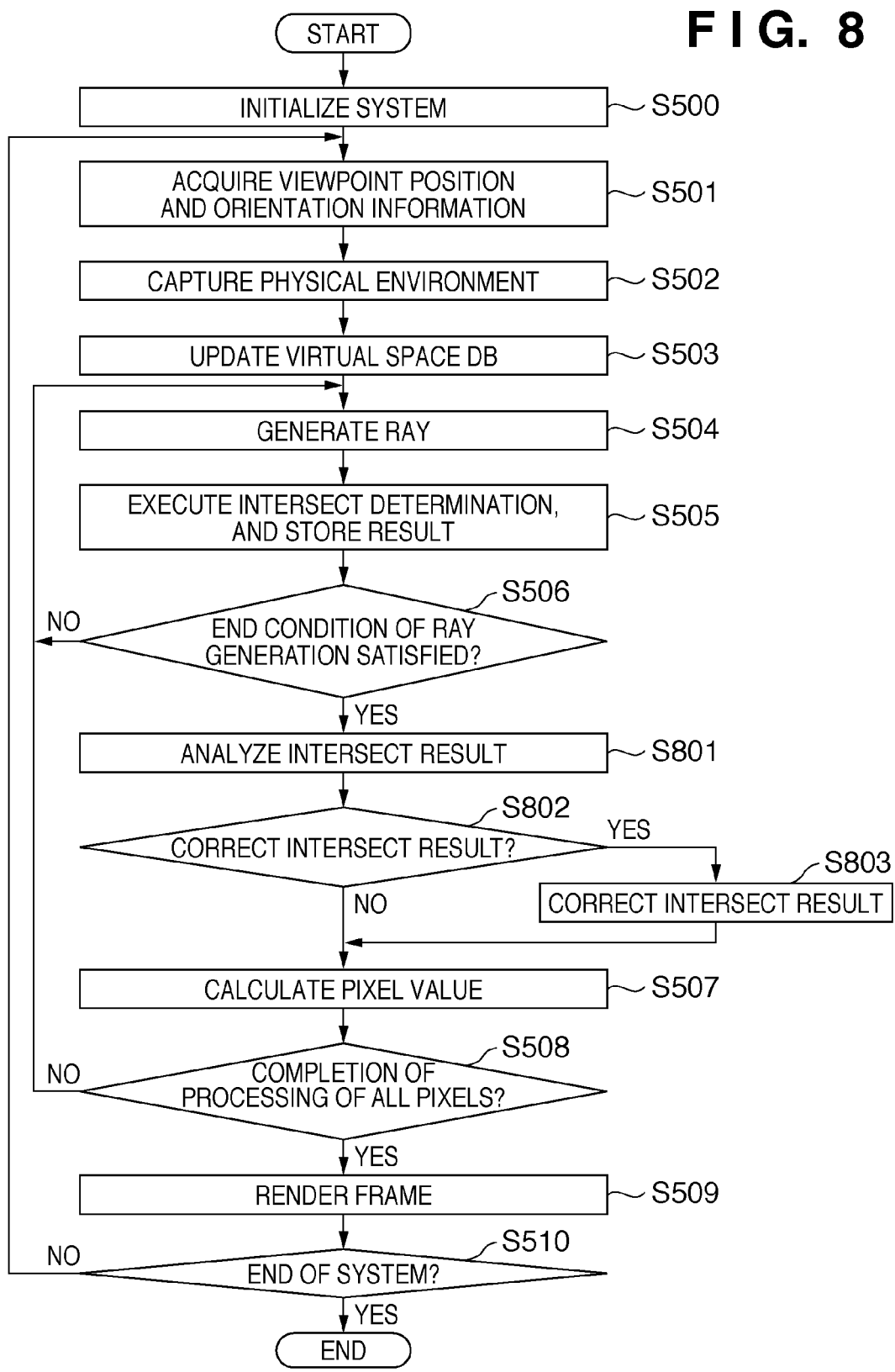
FIG. 8 is a flowchart of processing executed by an image processing apparatus according to the second embodiment of the present invention so as to generate a virtual space image based on the ray tracing method.

FIG. 8 is a flowchart of processing executed by the image processing apparatus of this embodiment so as to generate a virtual space image based on the ray tracing method. Note that the same step numbers in FIG. 8 denote the same processes as in FIG. 5, and a description thereof will not be repeated.

The image processing apparatus of this embodiment also acquires a physical space image parallel to the processing according to the flowchart shown in FIG. 8. Therefore, the processing to be executed by the image processing apparatus according to this embodiment is not only that according to the flowchart shown in FIG. 8. In the following description, of the processing to be executed according to the flowchart of FIG. 8, processing executed when a ray intersects with an approximate virtual object will be mainly explained. Therefore, descriptions of other situations will be simply described or will not be given.

In this embodiment, in order to solve an optical inconsistency that occurs when a ray successively intersects with an approximate virtual object, generation of the ray is not suppressed even when the ray successively intersects with the approximate virtual object. That is, only when one of the conditions "a ray reaches the virtual light source" and "a ray reaches infinity" is satisfied, the intersect determination unit 406 instructs the ray control unit 405 to stop generation of the ray.

Referring to FIG. 8, in step S801 the intersect determination unit 406 analyzes the intersect determination result of a ray based on several shadow, reflection, and refraction calculations made in step S505.

More specifically, the intersect determination unit 406 analyzes "with which virtual object a ray intersects", "whether or not a ray successively intersects with the approximate virtual object", "whether or not a ray intersects with another virtual object after it successively intersects with the approximate virtual object", and so forth.

The intersect determination unit 406 determines in step S802 based on the analysis result in step S801 whether or not to correct the intersect result of the ray calculated several times. A condition required to correct the intersect result is that the ray successively intersects with the approximate virtual object and it then does not intersect with another virtual object. In such case, since a shadow is cast by a physical object, and light coming from the light source is not intercepted by another virtual object, a shadow calculation can be skipped. Therefore, if the aforementioned condition is satisfied, the process advances to step S803 to correct the intersect result. On the other hand, if the condition is not satisfied, the processes in step S507 and subsequent steps are executed.

In step S803, the intersect determination unit 406 corrects the intersect determination result of the ray calculated in step S505. More specifically, the intersect determination unit 406 corrects (invalidates or deletes) the intersect result after the ray successively intersects with the approximate virtual object. Then, the processes in step S507 and subsequent steps are executed.

As described above, according to this embodiment, an optical inconsistency that occurs due to suppression of generation of the ray can be solved.

[Third Embodiment]

In the second embodiment, generation of a ray is recursively repeated until the end condition of the ray tracing method is satisfied without suppressing generation of the ray. When the end condition is satisfied, the intersect determination unit 406 reexamines the intersect determination log, and determines a final pixel value by discarding an unnecessary intersect result.

In this embodiment, when the end condition is satisfied, the pixel value calculation unit 407 executes a required pixel value calculation based on the determination result of the intersect determination unit 406 to calculate a final pixel value. That is, even when a ray successively intersects with an approximate virtual object, if the subsequent ray intersects with a virtual object, a shadow calculation based on that virtual object is made to calculate a final pixel value. After the ray successively intersects with the approximate virtual object, if it does not intersect with another virtual object, a final pixel value calculation is made without any shadow calculation.

In this embodiment as well, the same image processing apparatus shown in FIG. 4 as in the first embodiment is used.

Figure 9:
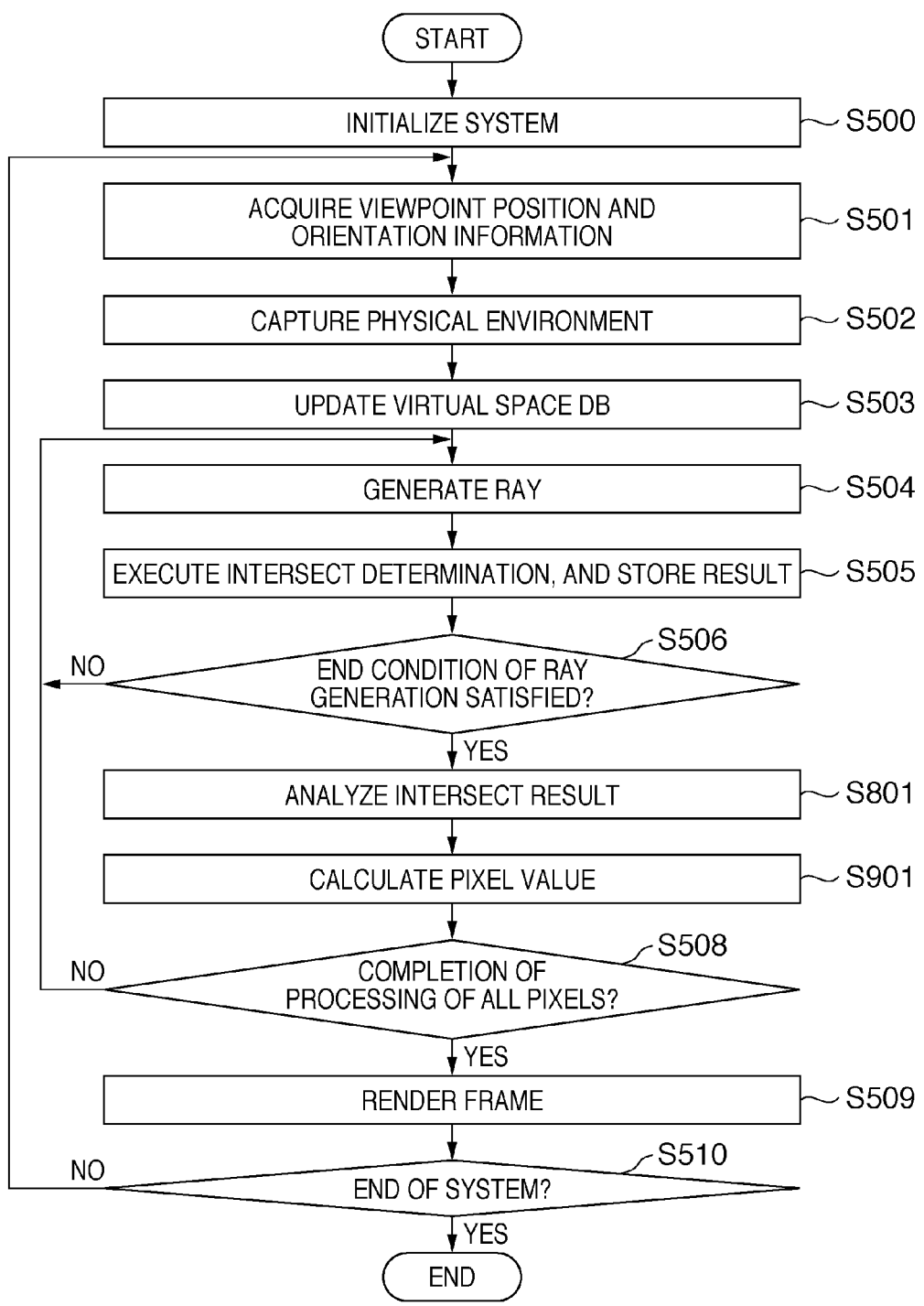
FIG. 9 is a flowchart of processing executed by an image processing apparatus according to the third embodiment of the present invention so as to generate a virtual space image based on the ray tracing method.

FIG. 9 is a flowchart of processing to be executed by the image processing apparatus according to this embodiment so as to generate a virtual space image based on the ray tracing method. Note that the same step numbers in FIG. 9 denote the same processes as in FIGS. 5 and 8, and a description thereof will not be repeated.

In step S901, the pixel value calculation unit 407 determines a pixel value based on the analysis result in step S801. In the second embodiment, a pixel value is calculated using the corrected intersect determination result. However, in this embodiment, even when a ray successively intersects with an approximate virtual object, if the subsequent ray intersects with a virtual object, a shadow calculation based on that virtual object is made to calculate a final pixel value. After the ray successively intersects with the approximate virtual object, if it does not intersect with another virtual object, a final pixel value calculation is made without any shadow calculation.

As described above, according to this embodiment, as in the processing result in the second embodiment, an optical inconsistency that occurs due to suppression of generation of a ray can be solved.

[Fourth Embodiment]

In the second and third embodiments, a pixel value is determined using the intersect determination log information of the intersect determination unit 406. However, in this embodiment, when a ray successively intersects with virtual elements, whether or not to render a shadow is determined based on the relationship between an intersection point distance and the sizes of the virtual elements.

Figure 10:
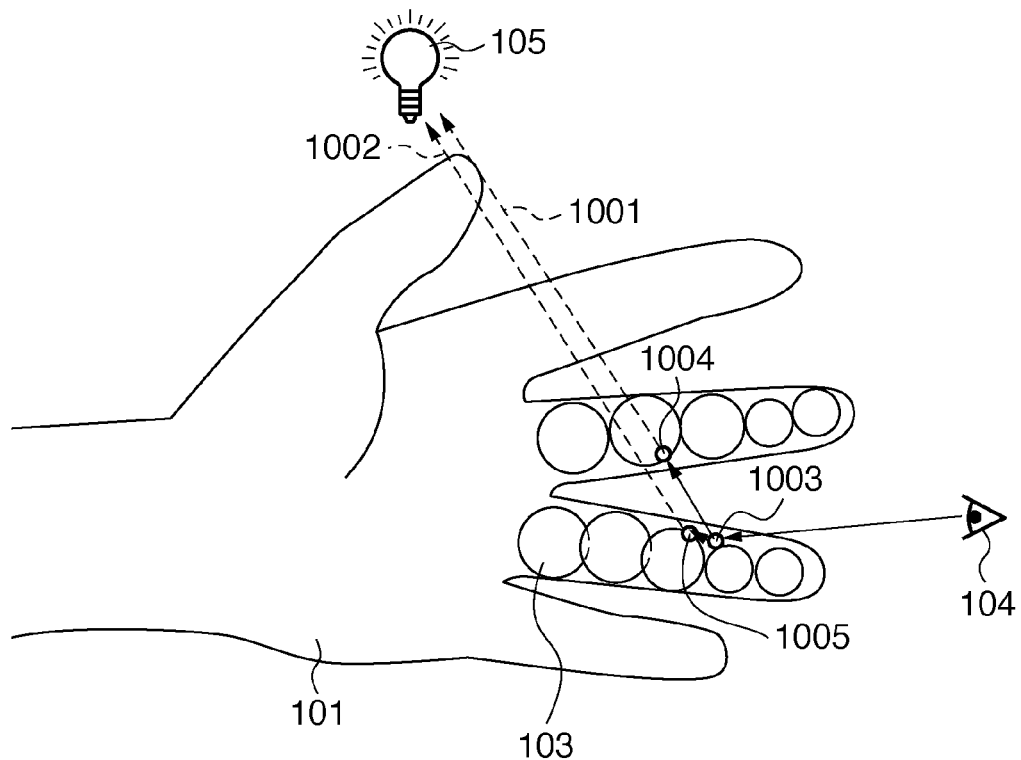
FIG. 10 is a view for explaining processing for determining using information of a distance between intersection points whether or not to render a shadow.

FIG. 10 is a view for explaining processing for determining using information of an intersection point distance whether or not to render a shadow.

A ray 1001 is obtained when a ray generated from the virtual viewpoint 104 is reflected by a virtual element 103 at an intersection point 1003, intersects with another virtual element 103 at an intersection point 1004 again, and then reaches the virtual light source 105. At this time, at the intersection point 1003, a cast shadow is generated under the influence of the virtual element 103 with which the ray intersects at the intersection point 1004.

The ray reflected at the intersection point 1003 is reflected by still another virtual element 103 at an intersection point 1005, and then reaches the virtual light source 105. At this time, at the intersection point 1003, a self-shadow is generated under the influence of the virtual element 103 with which the ray intersects at the intersection point 1005.

If the physical object 101 corresponds to the index finger and middle finger of a person under the condition that physical and virtual light sources match, a cast shadow is generated from the index finger over the middle finger on the physical space. That is, a shadow due to the cast shadow under the influence of the intersection point 1004 also exists on a physical world, as shown in FIG. 10. Therefore, even when that shadow is rendered, the user does not feel unnatural.

However, a self-shadow under the influence of the neighboring virtual elements 103 like the intersection point 1005 is a shadow which never exists on the physical space. Therefore, if that shadow is rendered, the user feels very unnatural.

This embodiment has been made in consideration of the above problems, and determines based on distance information between intersection points if a shadow is necessary or unnecessary, when a ray successively intersects with virtual elements, thus solving an optical inconsistency.

In this embodiment as well, the image processing apparatus shown in FIG. 4 is used as in the first embodiment.

As for the processing to be executed by the image processing apparatus according to this embodiment so as to generate a virtual space image based on the ray tracing method, the processes in step S505 and S801 in the flowchart of FIG. 8 are modified as follows.

In step S505, the intersect determination unit 406 calculates a distance between the intersection points in addition to the process described in the first embodiment.

In step S801, the intersect determination unit 406 also analyzes the distance between the intersection points calculated in step S505 in addition to the intersect determination result of the ray due to several shadow, reflection, and refraction calculations made in step S505.

The information of the intersection point distance is used to compare the sizes (radii in case of spheres or distance information between planes in case of polygons) of virtual elements with which the ray intersects. That is, if the intersection point distance is larger than the virtual element with which the ray intersects, it is determined that the ray intersects with an object that produces a cast shadow. Conversely, if the intersection point distance is smaller than the virtual element, it is determined that the ray intersects with an object that produces a self shadow, and the influence of a shadow due to that object is invalidated.

In this manner, an optical inconsistency can be solved in also consideration of information of the intersection point distance.

[Fifth Embodiment]

In the description of each of the above embodiments, the units shown in FIG. 4 are implemented by hardware. However, the units except for the virtual space DB 401 may be implemented by computer programs. In this case, the same processes as in the above embodiments can be implemented when computer programs corresponding to the respective units are executed by a general PC (personal computer) having the virtual space DB 401.

Figure 11:
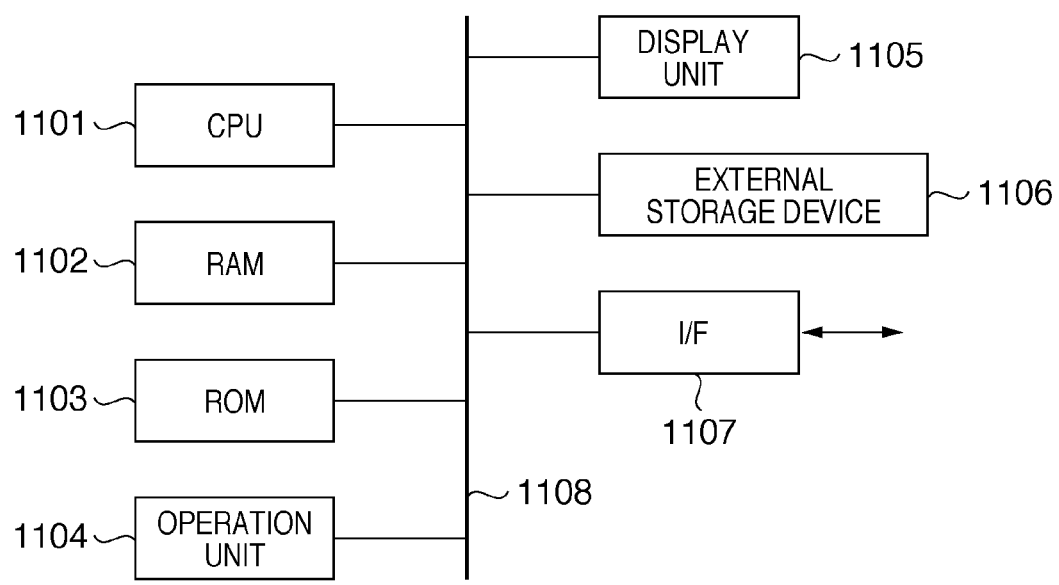
FIG. 11 is a block diagram showing an example of the hardware arrangement of a computer which can execute computer programs corresponding to respective units except for a virtual space DB 401.

FIG. 11 is a block diagram showing an example of the hardware arrangement of a computer which can execute computer programs corresponding to the respective units except for the virtual space DB 401.

A CPU 1101 controls this computer as a whole using programs and data stored in a RAM 1102 and ROM 1103, and executes the aforementioned processes described as those to be implemented by the image processing apparatus having the arrangement shown in FIG. 4. These processes include those according to the flowcharts shown in FIGS. 5, 8, and 9.

The RAM 1102 has an area for temporarily storing programs and data loaded from an external storage device 1106, data externally received via an I/F (interface) 1107, and the like. Furthermore, the RAM 1102 has a work area used when the CPU 1101 executes various processes. That is, the RAM 1102 can provide various areas as needed.

The ROM 1103 saves a boot program, setting data, and the like.

An operation unit 1104 comprises a keyboard, mouse, and the like. When an operator of this computer operates the operation unit 1104, he or she can input various instructions to the CPU 1101. Inputs using the operation unit 1104 include, for example, an operation input to end processing, and the like.

A display unit 1105 comprises a CRT, liquid crystal display, or the like, and can display the processing result of the CPU 1101 by means of images, text, and the like.

The external storage device 1106 is a large-capacity information storage device represented by a hard disk drive. The external storage device 1106 saves an OS (operating system), and programs and data which make the CPU 1101 execute the aforementioned processes described as those to be implemented by the image processing apparatus. These programs include those which make the CPU 1101 execute the operations of the respective units except for the virtual space DB 401 (strictly speaking, except for the information holding function of the virtual space DB 401) of the units shown in FIG. 4. The data saved in the external storage device 1106 include data described as those stored and held by the virtual space DB 401.

The programs and data saved in the external storage device 1106 are loaded onto the RAM 1102 as needed under the control of the CPU 1101. When the CPU 1101 executes the processes using the loaded programs and data, this computer can execute the processes described as those to be implemented by the image processing apparatus.

To the I/F 1107, the HMD, position and orientation sensor, and the like can be connected.

Reference numeral 1108 denotes a bus which interconnects the aforementioned units.

[Sixth Embodiment]

In the first to fifth embodiments, a plurality of virtual elements configures an approximate virtual object. However, a plurality of virtual elements need not be used, and an approximate virtual object may be configured by a single virtual element. In the following embodiments, assume that an approximate virtual object is configured by at least one virtual element.

[Seventh Embodiment]

This embodiment will explain a method of optically consistently rendering a shadow of a virtual object for an image of a shadow which appears in a physical space image and is cast from a physical object over another physical object. More specifically, a shadow of a virtual object is rendered by excluding a region where a shadow is cast from a physical object over another physical object.

Figure 12:
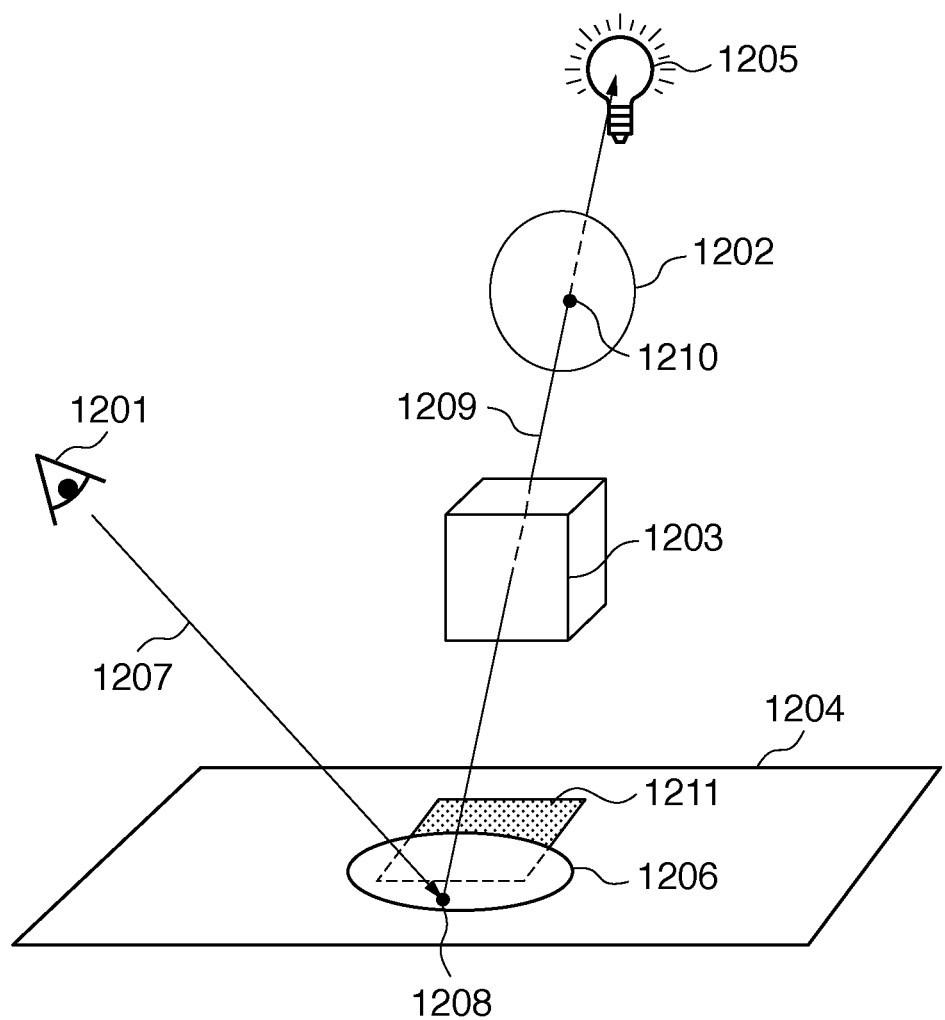
FIG. 12 is a view for explaining main processing according to the seventh embodiment of the present invention.

FIG. 12 is a view for explaining main processing according to this embodiment. FIG. 12 expresses an MR space including physical and virtual objects. Referring to FIG. 12, reference numeral 1201 denotes a virtual viewpoint which corresponds to a physical camera as a viewpoint of a viewer. Reference numeral 1202 denotes a spherical physical object. On a region occupied by this physical object 1202, an approximate virtual object 1202' (not shown) which simulates the shape of the spherical physical object 1202 (to have the same shape and size) is laid out. Reference numeral 1203 denotes a cubic virtual object; and 1204, a planar physical object. On a region occupied by this physical object 1204, an approximate virtual object 1204' (not shown) which simulates the shape of the planar physical object 1204 is laid out. Reference numeral 1205 denotes a physical light source. At the position and orientation of this light source 1205, a virtual light source 1205' (not shown) which simulates the physical light source 1205 is laid out. Reference numeral 1206 denotes an image of a physical shadow which is cast over the physical object 1204 since the light source 1205 is intercepted by the physical object 1202. In the following description, if a virtual object or approximate virtual object is simply expressed as an "object" without distinguishing them, it indicates the virtual object and approximate virtual objects as a whole.

A case will be examined below wherein an image is rendered in a state as if the virtual object 1203 were casting a shadow over the physical object 1204. As for the light source 1205', the region of the (physical) shadow 1206 is already intercepted by the physical object 1202. Whether or not the region of the shadow 1206 is intercepted remains the same even when a virtual object that intercepts the light source 1205' is added. Therefore, even inside a region 1211 of a virtual shadow formed by the virtual object 1203 in association with the light source 1205', pixel values of corresponding pixels on the physical space image are used intact (without reflecting any influence of a virtual shadow) in association with a part that overlaps the region of the physical shadow 1206.

In order to implement such shadow rendering control, in this embodiment, a ray called a shadow ray is generated from an intersection point between a primary ray and object toward each light source, and the presence/absence of an intersect between the shadow ray and object is checked. Then, a condition required not to render a virtual shadow even when the light source is intercepted by the virtual object is that "the shadow ray generated from the approximate virtual object intersects with another approximate virtual object".

For example, since a shadow ray 1209, generated from a point (intersection point) 1208 on the approximate virtual object 1204' with which a primary ray 1207 intersects first, intersects with the approximate virtual object 1202' at a point 1210, the above condition is satisfied. Therefore, a virtual shadow is not rendered for the intersection point 1208.

Note that the above condition is valid even when the shadow ray does not successively intersect with the approximate virtual objects. This is because the order that the shadow ray intersects with objects is independent of whether or not the light source is intercepted.

The main processing according to this embodiment will be described in more detail below.

Note that only the primary ray and shadow ray generated from an intersection point with the primary ray toward the light source will be considered. That is, a ray which is reflected or refracted by the surface of an object is not considered. Also, assume that the number of light sources is one, and each approximate virtual object simulates not only the shape of a physical object but also a material attribute. Furthermore, the main processing according to this embodiment to be described below is executed using a computer (image processing apparatus) having the hardware arrangement example shown in FIG. 11.

In the following description, a pixel on an image to be generated through which the primary ray passes will be referred to as a "pixel to be rendered", and a point on an object (virtual object or approximate virtual object) with which the primary ray intersects first will be referred to as a "point to be rendered".

Figure 13:
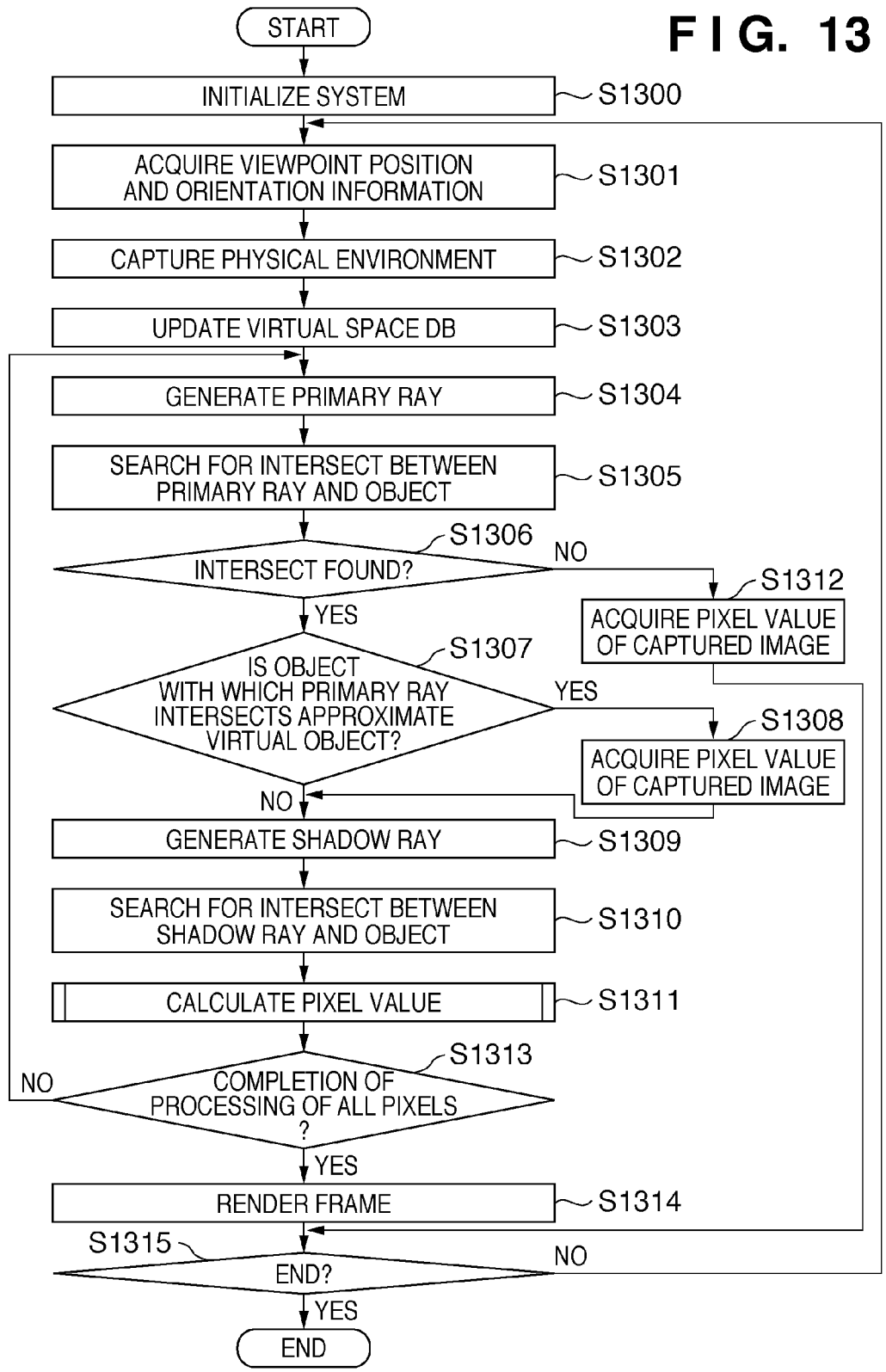
FIG. 13 is a flowchart of processing executed by an image processing apparatus according to the seventh embodiment of the present invention so as to generate an MR image based on the ray tracing method.

FIG. 13 is a flowchart of processing to be executed by the image processing apparatus according to this embodiment so as to generate an MR image based on the ray tracing method.

Since the processes in steps S1300 to S1303 are the same as those in steps S500 to S503 shown in FIG. 9, a repetitive description thereof will be avoided.

In step S1304, a primary ray which passes through a pixel to be rendered is generated from the virtual viewpoint.

In step S1305, a point where the primary ray and a virtual object or approximate virtual object intersect first, that is, a point to be rendered is searched, and the search result is stored in the RAM 1102.

In step S1306, the presence/absence of an intersect is checked with reference to the search result in step S1305. As a result of checking, if no intersect is found, since the pixel to be rendered corresponds to a background, the process advances to step S1312 to acquire a pixel value of a captured image. The process then advances to step S1315. Note that "to acquire a pixel value of a captured image" means that a pixel value of a pixel corresponding to the pixel to be rendered of those on the captured image is acquired, and is set as that of the pixel to be rendered on the image to be generated (the same applies to the following description). Note that data of the image to be generated is stored in the RAM 1102.

On the other hand, if it is determined in step S1306 that an intersect is found, the process advances to step S1307.

It is determined in step S1307 with reference to the search result in step S1305 whether or not an object with which the primary ray intersects first is the approximate virtual object. If it is determined in step S1307 that the object is the approximate virtual object, since the point to be rendered is located on the physical object, the process advances to step S1308. In step S1308, a pixel value of a captured image is acquired.

On the other hand, if it is determined in step S1307 that the primary ray intersects with the virtual object, the process advances to step S1309.

In step S1309, a shadow ray is generated from the intersection point between the primary ray and object toward the light source.

In step S1310, an intersect between the shadow ray and object is checked. In this checking process, an object with which the shadow ray intersects first is not searched but all objects with which the shadow ray intersects until it reaches the light source are searched. The search result is stored in the RAM 1102.

In step S1311, a pixel value of the pixel to be rendered is calculated with reference to the search result in step S1310, and the process advances to step S1313. Details of the process in step S1311 will be described later.

It is checked in step S1313 if processing is complete for all pixels of the image to be generated (MR image). As a result of checking, if the processing is complete, the process advances to step S1314; otherwise, the process returns to step S1304.

In step S1314, the data of the generated image is read out from the RAM 1102, and is displayed on the display unit 1105.

If the user makes an operation input to end this processing (e.g., an operation with respect to the operation unit 1104) or if a condition required to end this processing is met, this processing ends via step S1315. On the other hand, if the user does not make any operation input to end this processing and the condition required to end this processing is not met, the process returns to step S1301 via step S1315, thus repeating the subsequent processes.

Figure 14:
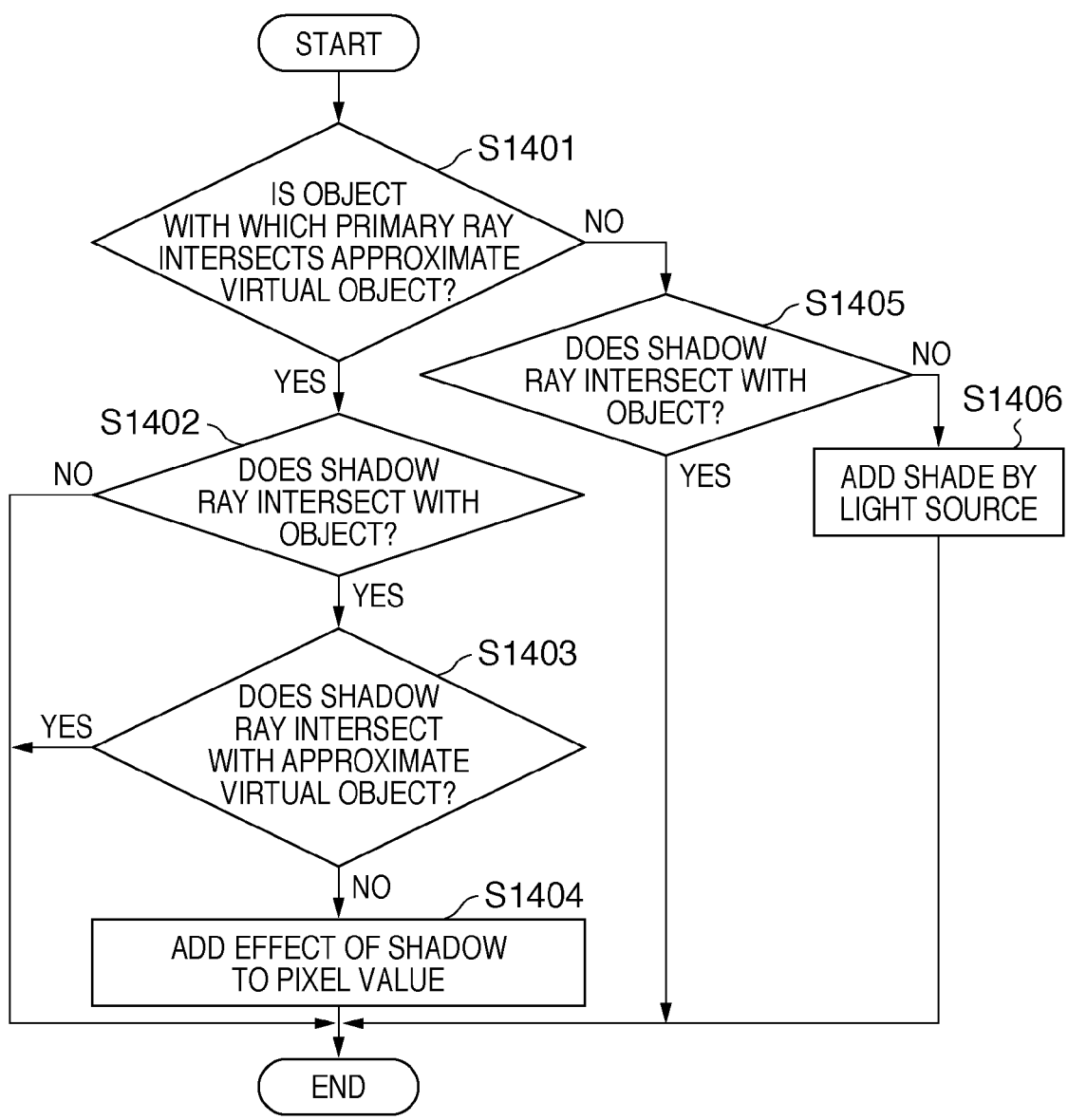
FIG. 14 is a flowchart showing details of the processing in step S1311, that is, pixel value calculation processing.

The pixel value calculation process in step S1311 will be described in more detail below. FIG. 14 is a flowchart showing details of the process in step S1311, that is, the pixel value calculation process.

It is checked in step S1401 with reference to the processing result in step S1305 whether or not the object with which the primary ray intersects first is the approximate virtual object. As a result of checking, if it is determined that the object is the approximate virtual object, the process advances to step S1402.

It is checked in step S1402 with reference to the search result in step S1310 if intersects between the shadow ray and objects are found. If no intersect is found, since there is no need to reflect the influence of a shadow to the pixel to be rendered, the process directly ends.

On the other hand, if it is determined in step S1402 that intersects are found, the process advances to step S1403.

It is checked in step S1403 with reference to the processing result in step S1310 if the objects with which the shadow ray intersects include the approximate virtual object or all the objects with which the shadow ray intersects are virtual objects. In the former case, since the point to be rendered is already included in a shadow cast from the physical object, the processing ends without changing a pixel value.

On the other hand, in the latter case, since the point to be rendered falls outside the region of the physical shadow, and the light source is intercepted by the virtual object, the process advances to step S1404. In step S1404, an effect of a shadow is added to the pixel value of the pixel to be rendered. More specifically, a pixel value, which would be added to the pixel to be rendered under the assumption that the point to be rendered is illuminated with the light source based on the material attribute of the approximate virtual object and the attribute of the light source, is calculated, and the calculated pixel value is subtracted from that of the pixel to be rendered.

On the other hand, if it is determined in step S1401 that the primary ray does not intersect with any approximate virtual object, the process advances to step S1405.

It is checked in step S1405 with reference to the processing result in step S1310 if the shadow ray intersects with one of the virtual object and approximate virtual object. If an intersect is found, since the point to be rendered (point on the virtual object) is not illuminated with this light source, shading processing based on this light source is skipped. That is, the processing ends without changing the pixel value of the pixel to be rendered.

On the other hand, if it is determined in step S1405 that the shadow ray does not intersect with any object, since the point to be rendered is illuminated with this light source, the process advances to step S1406.

In step S1406, a change in pixel value, which occurs when that point is illuminated with the light source, is calculated based on the material attribute of the virtual object including the point to be rendered and the attribute of the light source, and is added to the pixel value of the pixel to be rendered.

With the aforementioned processing, for a region where a shadow is cast from a physical object over another physical object, the influence of a shadow by a virtual object can be prevented from being reflected. As a result, a problem that a region over which shadows are cast from both the physical object and virtual object are rendered to be unnecessarily dark can be prevented, and an optically consistent shadow on both the physical and virtual worlds can be rendered.

In the above description, the number of light sources is one. However, the present invention is not limited to this, and the number of light sources may be two or more. If the number of light sources is two or more, the processes in steps S1309 to S1311 can be repeated for respective light sources.

The above description has been made in association with the primary ray. However, the present invention is not limited to this. The aforementioned method can be applied to a secondary ray or those with higher orders. As for a ray of Nth order (N is an integer equal to or larger than 2), "primary ray" in the above description can be read as "ray of Nth order".

[Eighth Embodiment]

In the intersect determination process of the shadow ray in the seventh embodiment (the process in step S1310), the virtual object and approximate virtual object are used as objects to be processed without distinguishing them. However, in order to detect if a shadow is cast from a physical object over another physical object, it suffices to inspect an intersect between the shadow ray and approximate virtual object. Therefore, in the intersect determination process of the shadow ray, if an intersect with the approximate virtual object is checked before that with the virtual object, the processing can be aborted earlier. That is, the processing can be speeded up. In the ray tracing method, since the load of the intersect determination process between a ray and object is heavy, a reduction of the number of processes is effective.

Hence, in this embodiment, the approximate virtual object is selected as an intersect determination object with the shadow ray before the virtual object. Note that an image processing apparatus applied to this embodiment uses a computer having the hardware arrangement shown in FIG. 11. Since the processing executed by the image processing apparatus according to this embodiment so as to generate an MR image based on the ray tracing method is the same as that in the flowchart shown in FIG. 13, a description of that processing will not be repeated.

Figure 15:
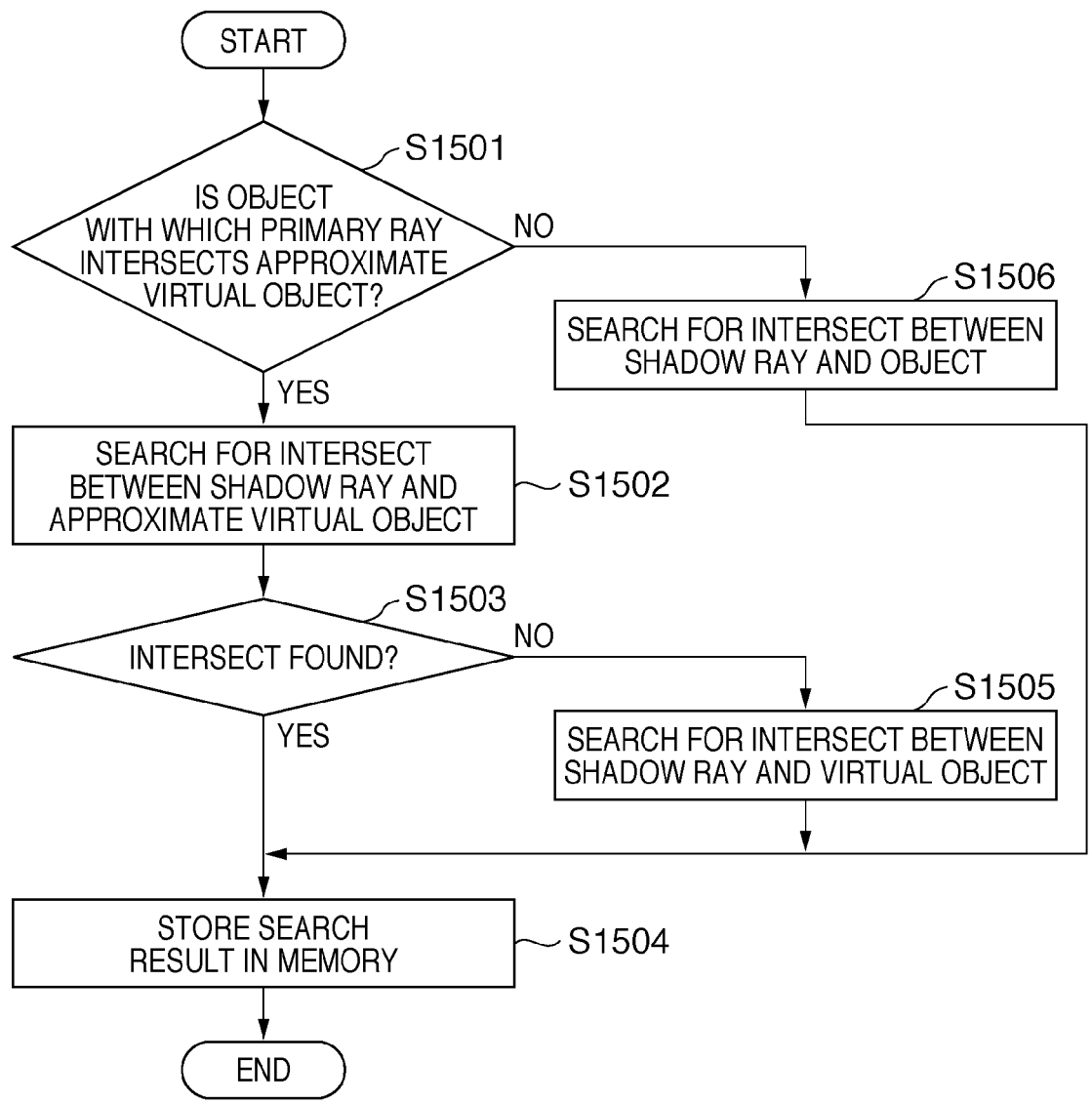
FIG. 15 is a flowchart showing details of the processing to be executed in step S1310 in the eighth embodiment of the present invention.

FIG. 15 is a flowchart showing details of the process to be executed in step S1310 in this embodiment. Note that "search for intersects" need not always check the presence/absence of intersects between the ray and all the objects to be processed, and if one object with which the ray intersects is found, the processing ends.

It is checked in step S1501 with reference to the processing result in step S1305 if the primary ray intersects with the approximate virtual object. As a result of checking, if it is determined that the primary ray intersects with the approximate virtual object, the process advances to step S1502. In step S1502, an intersect between the shadow ray and approximate virtual object is searched. Note that the determination result in step S1502 is stored in the RAM 1102.

It is then checked in step S1503 with reference to the processing result in step S1502 if the intersect between the shadow ray and approximate virtual object is found. As a result, if it is determined that the intersect is found, the process advances to step S1504. In step S1504, an intersect with the virtual object is not inspected, and the determination result is stored in the RAM 1102, thus ending the processing. Note that information stored in the RAM 1102 in step S1504 includes at least the presence/absence of the intersect between the shadow ray and object and the type of object (virtual object or approximate virtual object) if the intersect is found.

On the other hand, if it is determined in step S1503 that no intersect between the shadow ray and approximate virtual object is found, the process advances to step S1505. In step S1505, an intersect between the shadow ray and virtual object is searched, and the process then advances to step S1504.

If it is determined in step S1501 that the primary ray does not intersect with any approximate virtual object (it intersects with the virtual object), the process advances to step S1506. In step S1506, an intersect between the shadow ray and the virtual object or approximate virtual object is searched, and the process then advances to step S1504.

Upon completion of the process in step S1504, the intersect determination processing of the shadow ray as a whole ends.

As described above, according to this embodiment, upon rendering a region where a physical object casts a shadow over another physical object, since the intersect determination between the shadow ray and virtual object can be omitted, the processing can be speeded up.

As in the seventh embodiment, a plurality of light sources may be used, and a secondary ray or those of higher orders may be used in addition to the primary ray. The technique described in this embodiment can be similarly applied to such case.

[Ninth Embodiment]

This embodiment will explain a method of optically consistently rendering a reflection of a virtual object with respect to an image of reflection from a physical object to another physical object, which image appears in a captured image. More specifically, a region where an image of a physical object is reflected on another physical object is excluded, and a reflection of a virtual object is rendered.

Figure 16:
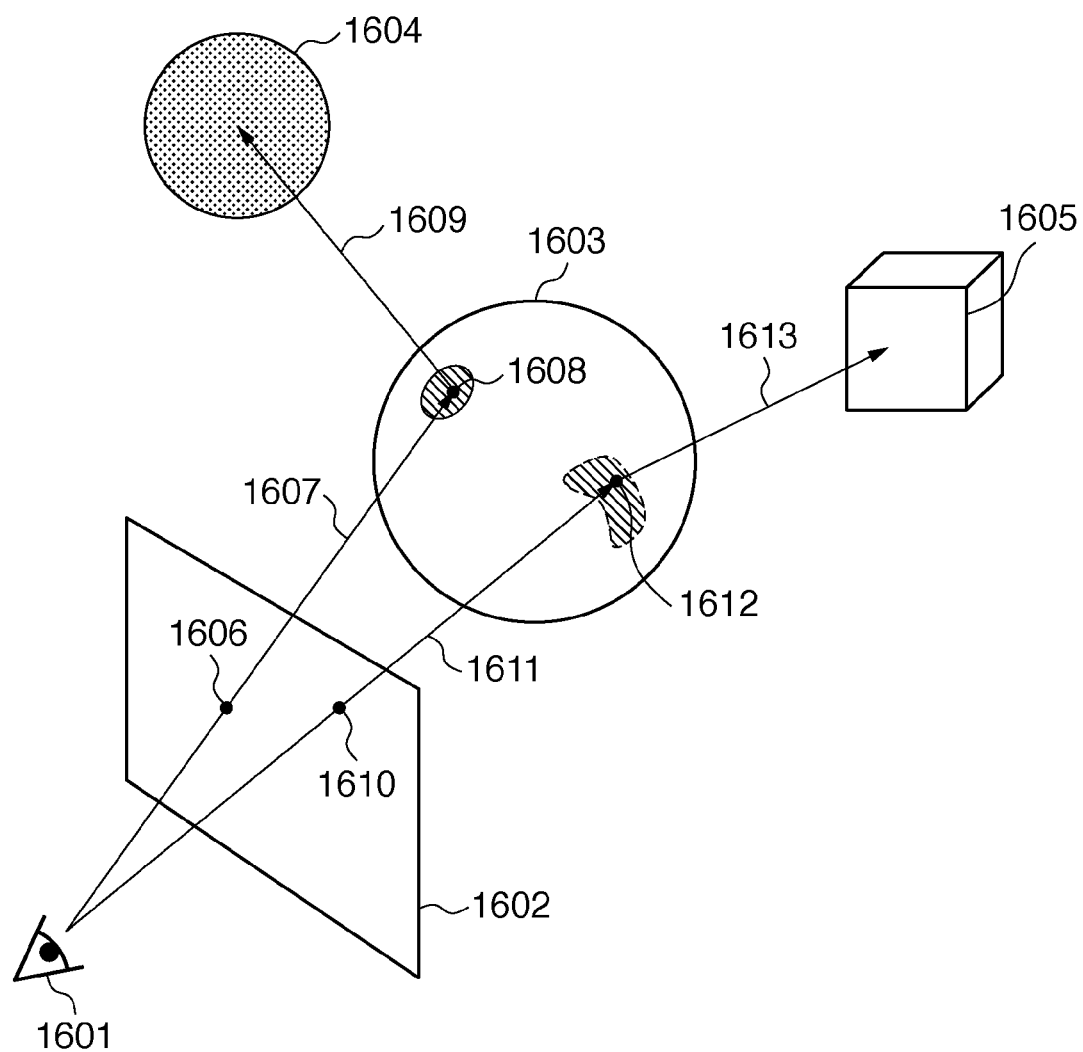
FIG. 16 is a view for explaining main processing according to the ninth embodiment of the present invention.

FIG. 16 is a view for explaining main processing according to this embodiment. FIG. 16 shows an MR space including physical and virtual objects.

Referring to FIG. 16, reference numeral 1601 denotes a virtual viewpoint corresponding to a physical camera as a viewpoint of a viewer; and 1602, a projection plane (image plane) used to project an MR space so as to generate an MR image. Reference numeral 1603 denotes a spherical physical object. On a region occupied by that physical object 1603, an approximate virtual object 1603' (not shown) which simulates the shape of the spherical physical object 1603 (to have the same shape and size) is laid out. Reference numeral 1604 denotes a spherical physical object. On a region occupied by that physical object 1604, an approximate virtual object 1604' (not shown) which simulates the shape of the spherical physical object 1604 (to have the same shape and size) is laid out. Reference numeral 1605 denotes a cubic virtual object.

A case will be examined below wherein a primary ray 1607 is generated from the virtual viewpoint 1601 via a pixel 1606. Furthermore, assume that the primary ray 1607 intersects the approximate virtual object 1603' first at a point 1608, and a reflected ray 1609 generated in a direction in which the primary ray 1607 is reflected at the point 1608 intersects the approximate virtual object 1604' first.

At this time, a reflection from the physical object 1604 to the physical object 1603 at the point 1608 appears in a pixel in a captured image corresponding to the pixel 1606. Therefore, by adding the influence of a reflection from the approximate virtual object 1604' to the approximate virtual object 1603' to the pixel 1606, the reflection to be applied to that pixel is doubled. Hence, when the reflected ray generated from the approximate virtual object intersects with another approximate virtual object first, no reflection is rendered.

On the other hand, a case will be explained below wherein a reflected ray generated from the approximate virtual object intersects with the virtual object first. That is, for example, when a reflected ray 1613, obtained when a primary ray 1611, which comes from the virtual viewpoint 1601, and intersects with the approximate virtual object 1603' at a point 1612 via a pixel 1610, is reflected, intersects with the virtual object 1605, no reflection of the virtual object 1605 appears in a captured image. Hence, the influence of that ray is calculated, and is added to the pixel 1610.

The main processing according to this embodiment will be described below. Note that the reflected ray is aborted up to the secondary ray. Note that an image processing apparatus applied to this embodiment uses a computer having the hardware arrangement shown in FIG. 11.

Figure 17:
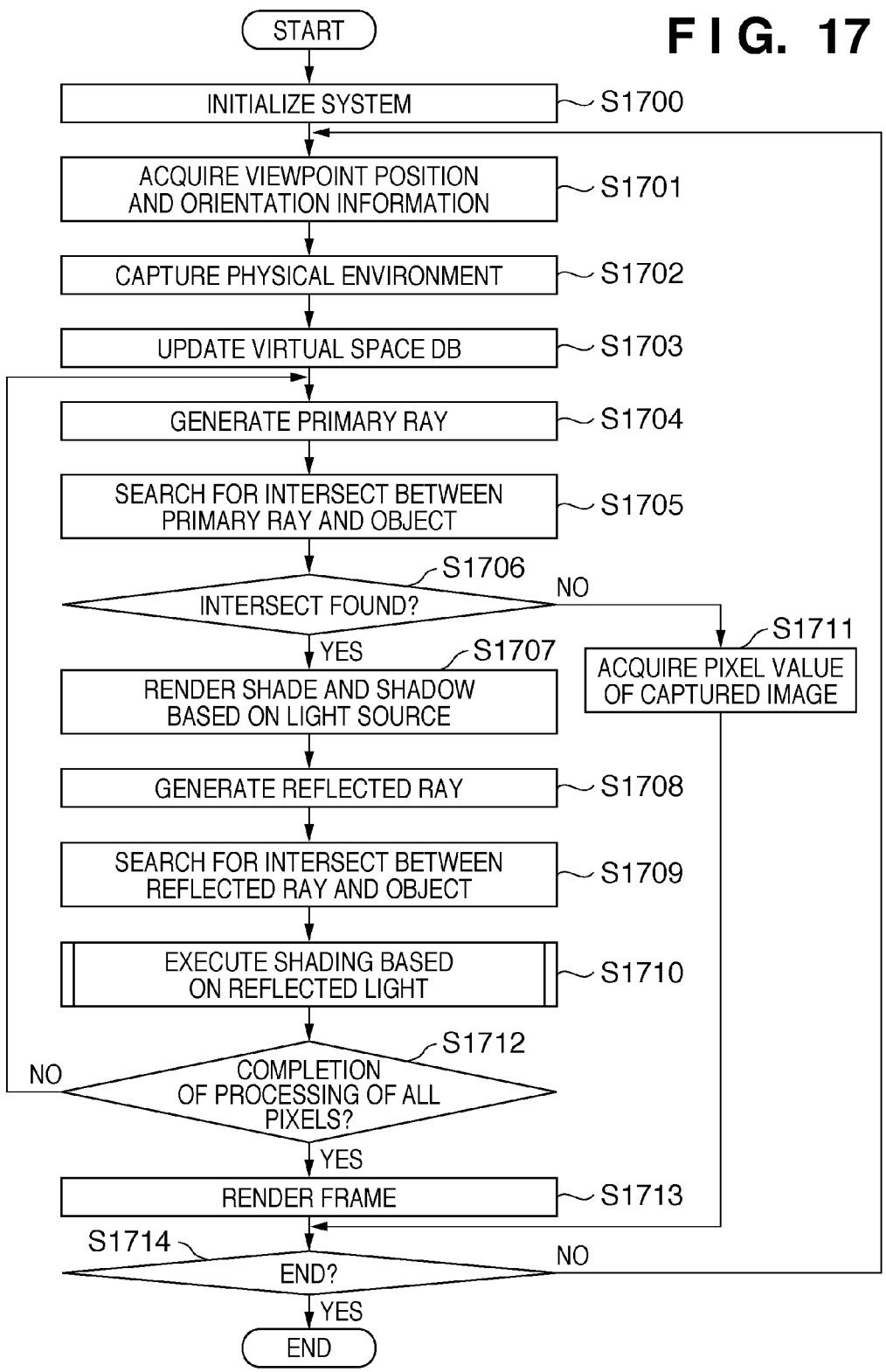
FIG. 17 is a flowchart of processing executed by an image processing apparatus according to the ninth embodiment of the present invention so as to generate an MR image based on the ray tracing method.

FIG. 17 is a flowchart of processing to be executed by the image processing apparatus according to this embodiment so as to generate a virtual space image based on the ray tracing method.

The processes in steps S1700 to S1703 are the same as those in steps S500 to S503 shown in FIG. 9, and a repetitive description thereof will be avoided.

In step S1704, a primary ray that passes through a pixel to be rendered is generated from the virtual viewpoint.

In step S1705, a point where the primary ray and the virtual object or approximate virtual object intersect first, that is, a point to be rendered is searched, and the search result is stored in the RAM 1102. Note that the information stored in step S1705 includes at least the presence/absence of an intersect between the primary ray and object, and the type of object (virtual object or approximate virtual object) when an intersect is found.

The presence/absence of an intersect between the primary ray and object is checked in step S1706 with reference to the search result in step S1705. As a result of checking, if it is determined that no intersect is found, since the pixel to be rendered corresponds to a background, the process advances to step S1711. In step S1711, a pixel value of a captured image is acquired, and the process advances to step S1712.

On the other hand, if it is determined in step S1706 that an intersect is found, the process advances to step S1707.

In step S1707, a shade generated at the point to be rendered by the light source and the influence of a shadow generated when the light source is intercepted by any object are calculated, and a pixel value of a pixel to be rendered is set. The contents of the process in step S1707 have already been described in the seventh embodiment, and a description thereof will not be repeated.

In step S1708, a reflected ray is generated from the intersection point between the primary ray and object.

In step S1709, an object with which the reflected ray intersects first is searched. The search result in step S1709 is stored in the RAM 1102.

In step S1710, shading processing based on the reflected ray is made based on the processing results in steps S1705 and S1709. Details of the process in step S1710 will be described later.

It is checked in step S1712 if the processing is complete for all pixels of an image to be generated. As a result of checking, if the processing is complete, the process advances to step S1713; otherwise, the process returns to step S1704.

In step S1713, data of the generated image is read out from the RAM 1102, and is displayed on the display unit 1105.

If the user makes an operation input to end this processing (e.g., an operation with respect to the operation unit 1104) or if a condition required to end this processing is met, this processing ends via step S1714. On the other hand, if the user does not make any operation input to end this processing and the condition required to end this processing is not met, the process returns to step S1701 via step S1714, thus repeating the subsequent processes.

Details of the process in step S1710 will be described below.

Figure 18:
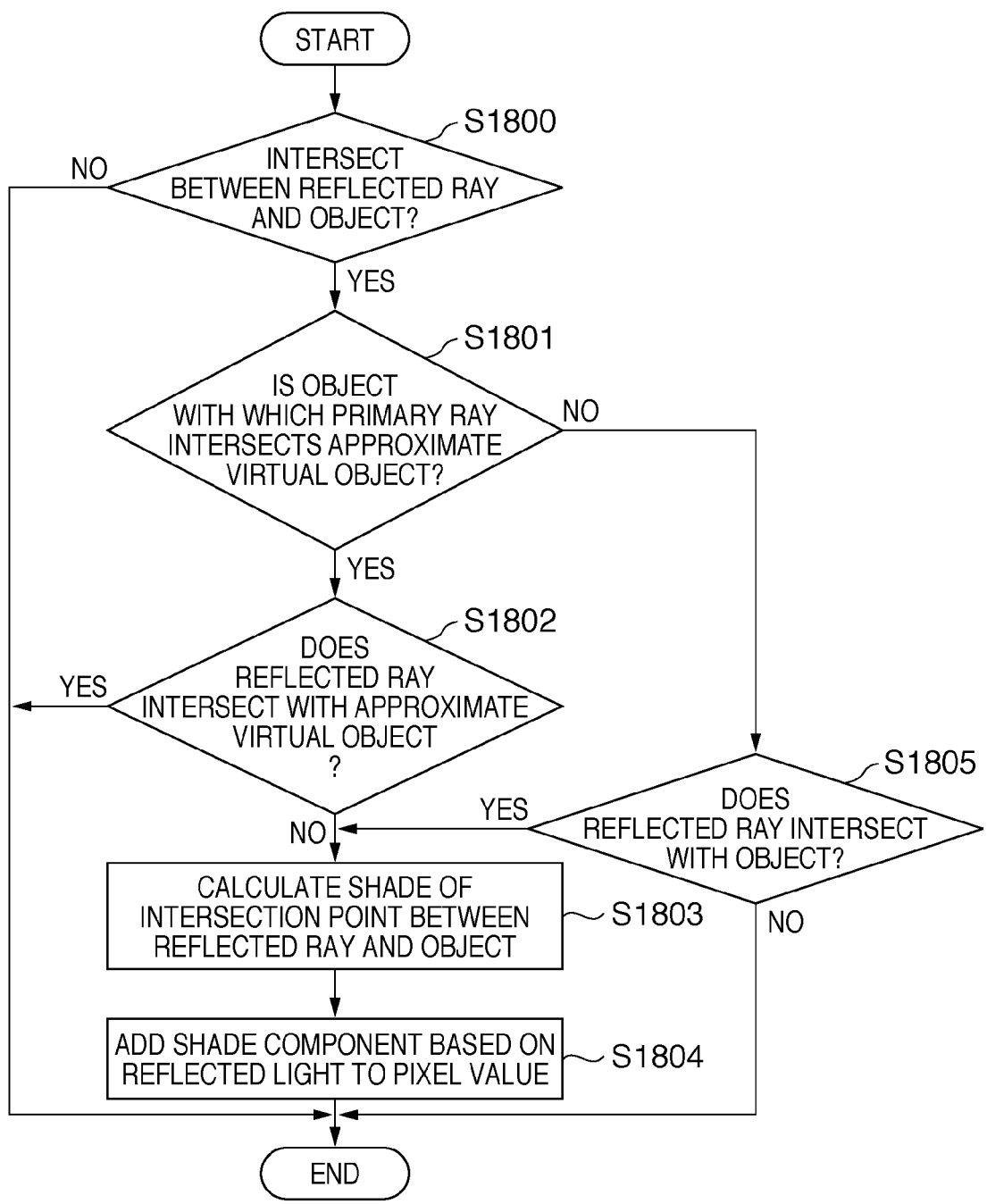
FIG. 18 is a flowchart showing details of the processing in step S1710, that is, shading processing based on reflected light.

FIG. 18 is a flowchart showing details of the process in step S1710, that is, the shading processing based on the reflected light.

The presence/absence of an intersect between the reflected ray and any of the objects is checked in step S1800 with reference to the processing result in step S1709. As a result of checking, if it is determined that an intersect is found, the process advances to step S1801. On the other hand, if it is determined that no intersect is found, since there is no reflection to the point to be rendered, the processing ends.

It is checked in step S1801 with reference to the processing result in step S1705 whether or not the object with which the primary ray intersects first is the approximate virtual object. As a result of checking, if it is determined that the object is the approximate virtual object, the process advances to step S1802.

It is checked in step S1802 with reference to the processing result in step S1709 whether or not the object with which the reflected ray intersects first is the approximate virtual object. As a result of checking, if it is determined in step S1802 that the object is the approximate virtual object, since the captured image already includes a reflection from the physical object to another physical object, the processing for adding the influence of the reflection to a pixel is skipped, and the processing ends.

On the other hand, if it is determined in step S1802 that the object with which the reflected ray intersects first is the virtual object, the process advances to step S1803.

In step S1803, a shade at the point where the reflected ray and object intersect is calculated. This process is the same as that in step S1707.

In step S1804, the influence exerted on a pixel value when the shade at the intersection point, which is calculated in step S1803, is reflected is calculated, and is added to the pixel value of the pixel to be rendered. The "influence exerted on the pixel value" is calculated by multiplying the shade calculated in step S1803 by the reflectance from the reflected ray direction to the primary ray direction at the point to be rendered.

On the other hand, it is checked in step S1805 with reference to the processing result in step S1709 whether or not the reflected ray intersects with any of the objects. As a result of checking, if an intersect is found, the process advances to step S1803. Upon completion of the process in step S1803, the process advances to step S1804 to add the influence of a reflection from the object with which the reflected ray intersects to the pixel value of the pixel to be rendered.

On the other hand, if it is determined in step S1805 that no intersect is found, since there is no reflection, the processing ends without changing the pixel value of the pixel to be rendered.

As described above, according to this embodiment, the influence of a reflection due to the virtual object is not reflected on a region where a reflection from the physical object to another physical object is generated. As a result, a problem that the influence of the reflection is reflected on a pixel value over again can be prevented, and an optically consistent reflection between the physical and virtual worlds can be rendered.

In the above description, the processing associated with the reflected light has been explained. The contents of the processing remains the same if the reflected light is replaced by refracted light. That is, this embodiment can be applied to the refracted light.

[10th Embodiment]

In the ninth embodiment, the reflected ray is limited up to the secondary ray. This embodiment will explain a method of rendering a reflection of a virtual object to be consistent with that from a physical object to another physical object in consideration of a reflected ray of arbitrary order.

The influence of a reflection from an object with which a ray of high order intersects propagates by tracing back rays, and is reflected on the pixel value. Therefore, if one of the following conditions is satisfied for any of reflected rays, the influence of a virtual object has to be added to a pixel value. That is, the pixel value of an image of reflection that appears in a captured image cannot be used in an image to be generated without being changed.

A reflected ray intersects with a virtual object.
Reflected light or refracted light from a virtual object enters a point where a reflected ray intersects.
A shadow is cast from a virtual object over a point where a reflected ray intersects.

Conversely, if all points where rays intersect do not receive any influence from a virtual object while tracing rays via a certain pixel to be rendered, a pixel value of that pixel is the same as that of a corresponding pixel of a captured image.

Hence, with a rendering method of this embodiment, when a condition that all traced rays intersect with approximate virtual objects is satisfied, the pixel value of a pixel of a captured image is set as that of the pixel to be rendered. When that condition is not satisfied, the influence of a virtual object is calculated.

The sequence of the rendering processing in this embodiment will be described below.

In the following description, assume that a reflected ray is generated up to the n-th order. The influence of a shadow cast when a light source is intercepted by an object will not be considered.

Figure 19:
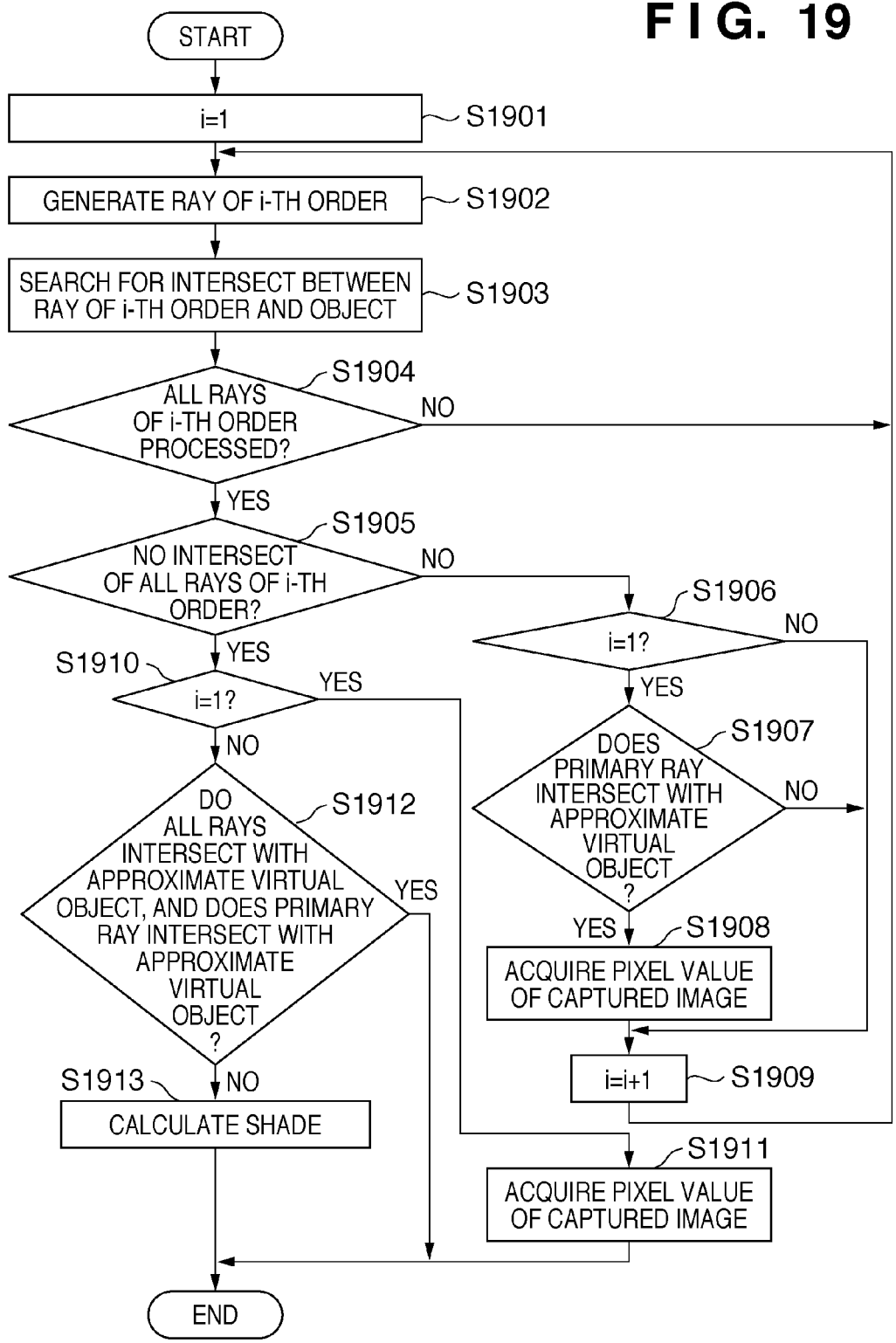
FIG. 19 is a flowchart of processing to be executed by an image processing apparatus according to the 10th embodiment of the present invention in association with pixels of an image generated by the image processing apparatus.

Note that an image processing apparatus applied to this embodiment uses a computer having the hardware arrangement shown in FIG. 11. FIG. 19 is a flowchart of processing to be executed by the image processing apparatus according to this embodiment in association with each pixel of an image to be generated by that image processing apparatus. Upon generating an image for one frame, the processing in FIG. 19 can be repeated for respective pixels.

In step S1901, a variable i indicating the order of ray is initialized to "1".

In step S1902, a ray of i-th order is generated.

In step S1903, an intersect between the generated ray and an object is searched, and the search result is stored in the RAM 1102. Note that data of the processing result includes at least the order of ray, the presence/absence of an intersect between the ray of i-th order and object, and the type of object with which the ray of i-th order intersects first (virtual object or approximate virtual object).

It is checked in step S1904 whether or not processing of all rays of i-th order required for a shading calculation is complete. Note that the types of rays required for the shading calculation are different depending on ray tracing calculation methods. For example, only rays corresponding to mirror reflected light may be used, and rays corresponding to diffuse reflected light may also be used. In any case, in step S1904 all rays used in respective calculation methods are checked. As a result of checking, if it is determined that processing for all rays is complete, the process advances to step S1905. On the other hand, if rays to be processed still remain, the process returns to step S1902 to select a ray to be processed, thus executing the subsequent processes.

In step S1905, the end condition of ray generation is checked. That is, whether or not all rays generated for respective orders do not intersect with any objects is checked. If all the rays do not intersect with any objects, the process advances to step S1910. On the other hand, if any of rays intersects with any of objects, the process advances to step S1906.

It is checked in step S1906 if the value of the variable i is "1". As a result of checking, if the value of the variable i is "1" (in case of a primary ray), the process advances to step S1907; otherwise, the process jumps to step S1909.

In step S1909, the value of the variable i is incremented by one to increase the order. After that, the process returns to step S1902.

On the other hand, it is checked in step S1907 whether or not an object with which the ray intersects is an approximate virtual object. As a result of checking, if the object with which the ray intersects is the approximate virtual object, the process advances to step S1908. In step S1908, a pixel value of a pixel to be rendered is acquired from a captured image. On the other hand, if the object with which the ray intersects is not the approximate virtual object, the process jumps to step S1909.

On the other hand, it is checked in step S1910 if the value of the variable i is "1", that is, the order of ray is "1". As a result of checking, if the order of ray is "1", since the pixel to be rendered belongs to a background region, the process advances to step S1911.

In step S1911, the pixel value is acquired from the captured image.

On the other hand, if it is determined that the order of ray is not "1", the process advances to step S1912.

It is checked in step S1912 with reference to the processing result in step S1903 if all the rays generated so far intersect with approximate virtual objects, and an object with which the primary ray intersects is an approximate virtual object. If this condition is not satisfied, since the shade of a virtual object is influenced on a physical object, the process advances to step S1913.

In step S1913, shading calculations are made for all the generated rays, and the calculation result is added to the pixel value of the pixel to be rendered.

On the other hand, if it is determined in step S1912 that the condition is satisfied, since no influence of the shade of a virtual object is exerted on the point to be rendered, the processing ends.

That is, according to this embodiment, only when a reflection of a physical object appears on another physical object, an image of a physical reflection included in a captured image is used; otherwise, the influence of a reflection from a virtual object is added to a pixel value. In this way, an optically consistent reflection image can be rendered.

In the above description, the method associated with a reflection has been explained. However, when a transmitting ray may be selected as an object to be processed in place of a reflected ray, the method of this embodiment can also be applied to an image of refraction. Furthermore, when both the reflected ray and transmitting ray are processed, the method of this embodiment can be applied to an image including both a reflection and refraction.

Furthermore, in the above description, a shadow is ignored. However, for example, when any shadow ray intersects with only a virtual object, the influence due to the virtual object is added to the pixel value; otherwise, the pixel value of a captured image is used without being changed. As a result of such selective use, this embodiment can also be applied to a case in which a shadow exists.

[11th Embodiment]

In the above description, the seventh to 10th embodiments are implemented by the computer having the hardware arrangement shown in FIG. 11. However, the seventh to 10th embodiments are not limited to implementation using the apparatus with that arrangement, but they may be implemented using apparatuses having other arrangements. For example, these embodiments may be implemented by the apparatus having the hardware arrangement shown in FIG. 4.

[Other Embodiments]

The objects of the present invention can also be achieved as follows. That is, a recording medium (or storage medium) which records a program code of software that can implement the functions of the aforementioned embodiments is supplied to a system or apparatus. Such storage medium is of course a computer-readable storage medium. A computer (or CPU or MPU) of the system or apparatus reads out and executes the program code stored in the recording medium. In this case, the program code itself read out from the recording medium implements the functions of the aforementioned embodiments, and the recording medium that records the program code constitutes the present invention.

When the computer executes the readout program code, an operating system (OS) or the like, which runs on the computer execute some or all of actual processes. The present invention also includes a case in which these processes can implement the functions of the aforementioned embodiments.

Furthermore, assume that the program code read out from the recording medium is written in a memory equipped on a function expansion card or function expansion unit, which is inserted into or connected to the computer. After that, a CPU or the like equipped on the function expansion card or unit executes some or all of actual processes, thereby implementing the functions of the aforementioned embodiments.

When the present invention is applied to the recording medium, that recording medium stores program codes corresponding to the aforementioned flowcharts.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-289966 filed Nov. 7, 2007 and Japanese Patent Application No. 2008-006291 filed Jan. 15, 2008 which are hereby incorporated by references herein in their entirety.

What is claimed is:

1. An image processing apparatus comprising:
a unit which combines a plurality of virtual elements so as to approximate a shape of a physical object, and lays out an approximate virtual object configured by the plurality of combined virtual elements on a virtual space;
a generation unit which generates a ray from a viewpoint to a ray source until the generated ray intersects with a virtual object on the virtual space and generates a new ray from an intersection point at which the generated ray intersects with the virtual object if the generated ray intersects with the virtual object, using a ray tracing method;
a determination unit which determines whether a first condition is satisfied where the generated ray intersects with the approximate virtual object successively and then the generated ray does not intersect with any other virtual objects until the generated ray reaches the ray source or infinity, and which determines whether a second condition is satisfied where the generated ray intersects with the approximate virtual object successively and then the generated ray intersects with a further virtual object until the generated ray reaches the ray source or infinity;
a calculation unit which calculates, when said determination unit determines that the first condition is satisfied, a pixel value corresponding to the generated ray which intersects with the approximate virtual object successively based on the generated ray from the viewpoint until a first intersection point at which the generated ray intersects with the approximate virtual object for the first time, without any shadow calculation; and which calculates, when said determination unit determines that the second condition is satisfied, a pixel value corresponding to the generated ray based on the generated ray from the viewpoint until a second intersection point at which the generated ray intersects with the further virtual object.

2. An image processing method to be executed by an image processing apparatus, the method comprising:
a step of combining a plurality of virtual elements so as to approximate a shape of a physical object, and laying out an approximate virtual object configured by the plurality of combined virtual elements on a virtual space;
a generation step of generating a ray from a viewpoint to a ray source until the generated ray intersects with a virtual object on the virtual space and generates a new ray from an intersection point at which the generated ray intersects with the virtual object if the generated ray intersects with the virtual object, using a ray tracing method;
a first determination step of determining whether a first condition is satisfied where the generated ray intersects with the approximate virtual object successively and then the generated ray does not intersect with any other virtual objects until the generated ray reaches the ray source or infinity;
a second determination step of determining whether a second condition is satisfied where the generated ray intersects with the approximate virtual object successively and then the generated ray intersects with a further virtual object until the generated ray reaches the ray source or infinity;
a first calculation step of calculating, when said first determination step determines that the first condition is satisfied a pixel value corresponding to the generated ray which intersects with the approximate virtual object successively based on the generated ray from the viewpoint until a first intersection point at which the generated ray intersects with the approximate virtual object for the first time, without any shadow calculation; and
a second calculation step of calculating, when said second determination unit determines that the second condition is satisfied, a pixel value corresponding to the generated ray based on the generated ray from the viewpoint until a second intersection point at which the generated ray intersects with the further virtual object.

3. A non-transitory computer-readable storage medium storing a program for making a computer execute an image processing method according to claim 2.

4. An image processing apparatus comprising:
a unit which lays out, on a virtual space, an approximate virtual object configured by at least one virtual element so as to approximate a shape of a physical object;
a generation unit which generates a ray from a viewpoint to a ray source until the generated ray intersects with a virtual object on the virtual space and generates a new ray from an intersection point at which the generated ray intersects with the virtual object if the generated ray intersects with the virtual object, using a ray tracing method;

a determination unit which determines whether a first condition is satisfied where the generated ray intersects with the approximate virtual object successively and then the generated ray does not intersect with any other virtual objects until the generated ray reaches the ray source or infinity, and which determines whether a second condition is satisfied where the generated ray intersects with the approximate virtual object successively and then the generated ray intersects with a further virtual object until the generated ray reaches the ray source or infinity;

a calculation unit which calculates, when said determination unit determines that the first condition is satisfied, a pixel value corresponding to the generated ray which intersects with the approximate virtual object successively based on the generated ray from the viewpoint until a first intersection point at which the generated ray intersects with the approximate virtual object for the first time, without any shadow calculation; and which calculates, when said determination unit determines that the second condition is satisfied, a pixel value corresponding to the generated ray based on the generated ray from the viewpoint until a second intersection point at which the generated ray intersects with the further virtual object.

5. The apparatus according to claim 4, wherein, when all objects with which the generated ray intersects are any of the approximate virtual objects, said calculation unit calculates a pixel value corresponding to the generated ray based on a ray until the first intersection point.

6. The apparatus according to claim 4, wherein said determination unit executes intersect determination between a ray generated based on the ray tracing method and the approximate virtual object, and when the generated ray and the approximate virtual object do not have a predetermined intersect state as a result of the intersect determination, said determination unit executes intersect determination between the generated ray and the virtual object.

7. The apparatus according to claim 4, further comprising a unit which acquires a physical space image obtained by capturing an image of a physical space, wherein when the generated ray and the virtual object have a predetermined intersect state, a pixel value of a pixel corresponding to the generated ray is set based on a pixel value of a pixel corresponding to the generated ray on the physical space image.

8. An image processing method to be executed by an image processing apparatus, the method comprising:

a step of laying out, on a virtual space, an approximate virtual object configured by at least one virtual element so as to approximate a shape of a physical object;

a generation step of generating a ray from a viewpoint to a ray source until the generated ray intersects with a virtual object on the virtual space and generating a new ray from an intersection point at which the generated ray intersects with the virtual object if the generated ray intersects with the virtual object, using a ray tracing method;

a first determination step of determining whether a first condition is satisfied where the generated ray intersects with the approximate virtual object successively and then the generated ray does not intersect with any other virtual objects until the generated ray reaches the ray source or infinity;

a second determination step of determining whether a second condition is satisfied where the generated ray intersects with the approximate virtual object successively and then the generated ray intersects with a further virtual object until the generated ray reaches the ray source or infinity;

a first calculation step of calculating, when said first determination step determines that the first condition is satisfied, a pixel value corresponding to the generated ray which intersects with the approximate virtual object successively based on the generated ray from the viewpoint until a first intersection point at which the generated ray intersects with the approximate virtual object for the first time, without any shadow calculation; and a second calculation step of calculating, when said second determination unit determines that the second condition is satisfied, a pixel value corresponding to the generated ray based on the generated ray from the viewpoint until a second intersection point at which the generated ray intersects with the further virtual object.

9. A non-transitory computer-readable storage medium storing a program for making a computer execute an image processing method according to claim 8.

* * * * *